United States Patent
Shioya et al.

(10) Patent No.: US 8,264,559 B2
(45) Date of Patent: Sep. 11, 2012

(54) IMAGE PICKUP APPARATUS AND IMAGE PICKUP METHOD

(75) Inventors: Hiroyuki Shioya, Kanagawa (JP); Mitsuharu Ohki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/758,266

(22) Filed: Apr. 12, 2010

(65) Prior Publication Data

US 2010/0253763 A1 Oct. 7, 2010

Related U.S. Application Data

(63) Continuation of application No. 11/132,029, filed on May 18, 2005, now Pat. No. 7,724,286.

(30) Foreign Application Priority Data

May 19, 2004 (JP) ................................ 2004-149679

(51) Int. Cl.
- H04N 5/225 (2006.01)
- H04N 5/262 (2006.01)
- H04N 5/228 (2006.01)
- G06K 9/36 (2006.01)

(52) U.S. Cl. ................ 348/218.1; 348/239; 348/208.16; 348/352; 382/284

(58) Field of Classification Search ................ 348/218.1, 348/239, 208.16, 352, 36, 37, 51, 50, 43, 348/308, 333.01–333.12; 382/284, 287, 382/291, 154

See application file for complete search history.

(56) References Cited

U.S. PATENT DOCUMENTS

| | | | |
|---|---|---|---|
| 6,097,854 A * | 8/2000 | Szeliski et al. ................ 382/284 |
| 6,133,943 A * | 10/2000 | Needham ........................ 348/37 |
| 6,549,650 B1 * | 4/2003 | Ishikawa et al. .............. 382/154 |
| 6,552,744 B2 * | 4/2003 | Chen ........................... 348/218.1 |
| 6,867,801 B1 * | 3/2005 | Akasawa et al. ........... 348/222.1 |
| 6,930,703 B1 * | 8/2005 | Hubel et al. .................... 348/37 |
| 7,098,914 B1 * | 8/2006 | Katayama et al. ............ 345/427 |
| 7,123,291 B2 * | 10/2006 | Horie .......................... 348/218.1 |
| 7,724,286 B2 * | 5/2010 | Shioya et al. .............. 348/218.1 |
| 2005/0168589 A1 * | 8/2005 | Silverstein et al. ........ 348/220.1 |
| 2005/0237631 A1 * | 10/2005 | Shioya et al. ................. 359/770 |
| 2010/0149358 A1 * | 6/2010 | Shioya et al. ............. 348/218.1 |

* cited by examiner

Primary Examiner — Lin Ye
Assistant Examiner — Marly Camargo
(74) Attorney, Agent, or Firm — Finnegan, Henderson, Farabow, Garrett & Dunner, L.L.P.

(57) ABSTRACT

This invention makes it possible to produce a high quality synthesized panoramic image when it is difficult to highly precisely shift the image pickup direction. The present invention provides an image pickup apparatus for synthetically generating a first image, or a whole image of an entire object of shooting, the apparatus comprising an image pickup section that sequentially changes the image pickup direction and picks up section of images of the object of shooting to be imaged, a reading section that reads second images, each having a predetermined width and constituting a part of the image picked up on an imaging plane in the image pickup section, a defining section that defines a reading range of each second image to be read by the reading section, a relative position identifying section that identifies the relative position of each second image relative to the first image, and a synthesizing section that generates the first image by sequentially and synthetically combining the second images read out by the reading section, the defining section being adapted to determine the first quantity of movement of each second image by referring to the relative position thereof as identified by the relative position identifying section and define the reading range of the second image to be read out next according to the first quantity of movement.

23 Claims, 13 Drawing Sheets

FIG. 8A — TECHNIQUE A
FIG. 8B — TECHNIQUE B

IMAGE PICKUP APPARATUS AND IMAGE PICKUP METHOD

This application is a continuation of U.S. application Ser. No. 11/132,029, filed May 18, 2005, now U.S. Pat. No. 7,724,286 and claims the benefit of Japanese Application No. JP 2004-149679, filed May 19, 2004, both of which are incorporated herein by reference.

CROSS-REFERENCE TO RELATED APPLICATIONS

The present invention contains subject matter related to Japanese Patent Application JP 2004-149679 filed in the Japanese Patent Office on May 19, 2004, the entire contents of which being incorporated herein by reference.

BACKGROUND OF THE INVENTION

1. Field of the Invention

This invention relates to an image pickup apparatus, an image pickup method and an image pickup program for generating a whole panoramic image by gradually and sequentially shifting the image pickup direction and pasting a plurality of picked up images side by side as well as to a recording medium adapted to store such images.

2. Description of the Related Art

Electronic still cameras have been and being popularly used. They are designed to convert the rays of light that pass through the lens of the camera as the camera shoots the object to be imaged by means of a solid state imaging element such as CCD into video signals, record the video signals on a recording medium and, if required, reproduce the recorded video signals. Many electronic still cameras are provided with a monitor screen so that the user can display a selected one of the still images that have been picked up and recorded. However, known electronic still cameras can shoot only a narrow scenic range that is limited by the view angle of the lens of the camera. In other words, the electronic still cameras cannot shoot a wide scenic range beyond the view angle of the lens.

In view of the above-identified circumstances, camera systems for obtaining a panoramic image have been proposed in recent years. Such camera systems are classified into the multiple lens type adapted to shoot a wide scenic range at a time and the single lens type adapted to gradually shift the image pickup direction and serially and continuously pick up unit images.

While the multiple lens type camera system has an advantage that it can be handled like an ordinary camera to generate a panoramic whole image at a time, it has a drawback that the entire camera system is costly.

On the other hand, the single lens type camera system (see, inter alia, Patent Document 1: Jpn. Pat. Appln. Laid-Open Publication No. 11-46317) is less costly but indispensably requires an image processing technique of generating a single panoramic whole image by bonding the unit images that are serially and continuously picked up together with overlapping areas in such a way that the boundaries of the unit images are not noticeable. However, such overlapping areas can remarkably increase or decrease when the image pickup direction is manually shifted. In the worst case, such overlapping areas can be totally lost to make the attempt of acquiring a whole image a complete failure.

Additionally, since unit images that are picked up at different clock times are pasted together with the single lens type camera system, a displacement or some other discontinuity is caused along the boundary of continuously picked up two images when an object is moving there. Then, the whole image that is ultimately produced can end up as failure.

Techniques of mechanically shifting the image pickup direction by means of a turntable that is equipped with a motor to pick up unit images have been proposed (see, inter alia, Patent Document 2: Jpn. Pat. Appln. Laid-Open Publication No. 6-225202). With the related art, a camera is fitted to a turntable that is securely held on a tripod and the turntable is driven to rotate slowly by means of a motor in order to mechanically shift the image pickup direction and pick up unit images.

The image pickup direction of a camera system can be changed freely when the camera system is securely held on a tripod and the turntable to which the camera is fitted is driven to rotate by means of a high precision motor. However, the obtained unit images can be blurred as a result of shifting the image pickup direction particularly when the user wants to manually adjust the image pickup direction or when the motor does not revolve highly precisely. Then, it may not be possible to produce overlapping areas in the unit images for the purpose of preparing a panoramic whole image by pasting the picked up unit images to make the attempt of acquiring a whole image a complete failure. Therefore, it may be recommendable for such a camera system to be adjusted in advance to produce large overlapping areas.

Image pickup apparatus adapted to pick up a plurality of unit images for a wide scene by means of a single lens for the purpose of obtaining a panoramic whole image have been proposed. However, any of the known image pickup apparatus that have been proposed in the past cannot realize a functional feature of being capable of obtaining a high quality panoramic whole image, while maintaining the economic advantage of commercially available digital cameras.

For example, Patent Document 2 discloses a camera having a functional feature of picking up a panoramic whole image and a rotary adaptor to be attached to the imaging section of the camera. The rotary adaptor takes the role of operating as drive source for driving the imaging section of the camera to turn. However, it gives rise to a number of problems when it is actually operated.

The first problem is that the camera is designed without properly taking the balance of the mass of the camera into consideration. The adaptor of the known camera takes the role of driving the imaging section of the camera to turn and is mounted on the camera to turn the camera main body itself. While it is ideal to turn only the lens and the necessary part of the imaging sensor, the known camera is designed to turn the camera main body itself that carries heavy parts including a battery. As a result, costly components have to be used to bear the rotary motion of the motor. Additionally, when the camera main body is hand-held for shooting, the user of the camera feels it cumbersome to hold the camera because the part held by hand is lightweight and the rotary part of the camera is heavy to make the balance of the mass of the camera inappropriate.

The second problem is that the user cannot operate the buttons of the camera and see the image being displayed on the display screen of the camera with ease. More specifically, various buttons including the shutter button and a display section are arranged on the camera main body that is driven to turn. When the user operates any of the buttons of the camera while he or she is turning the imaging section of the camera, the obtained image can be blurred to make the shooting operation unsuccessful. While such blurs may be avoided by using a release, it is not a general practice to use a release for a commercially available digital camera.

Additionally, since the display section of the camera also turns with the rotary motion of the imaging section of the camera, the user is required to follow the turning motion of the display section in order to visually confirm the shooting operation. Such a motion on the part of the user is also cumbersome to the user.

Furthermore, it is also cumbersome for the user to carry around the rotary adaptor that is not used frequently and only required to use when taking a panoramic picture. The camera system will be far from being compact and easy to carry if the rotary adaptor is constantly fitted to the camera main body.

Thus, rotary adaptors that are designed to be used for taking panoramic images have not been popular at all.

Japanese Patent No. 3348285 (Patent Document 3) describes an apparatus comprising a turntable arranged on a fixed base so that a camera system may be rotated by 360° for taking a panoramic picture by means of the apparatus. The apparatus is designed exclusively for taking panoramic pictures. The apparatus also comprises a photo-coupler for connecting a camera and a downstream processing section when shooting a visual field of 360° in a serial and continuously shooting session and a rotary angle sensor for gauging the rotary angle of the turntable to consequently make the apparatus very bulky and complex.

However, if such an apparatus is fitted to a commercially available digital camera in order to provide the camera with a functional feature of being capable of obtaining a panoramic whole image, the cost will inevitably be prohibitive. Additionally, such a known apparatus is designed to be arranged on a tripod and connected to an external computer for use. Therefore, it adversely affects a commercially available digital camera in terms of portability if it is fitted to the camera. Thus, it is not realistic to provide an ordinary camera with such a large and bulky apparatus.

SUMMARY OF THE INVENTION

Meanwhile, it is difficult to define overlapping areas of unit images picked up by a camera system at the time of designing the camera system.

This is because the volume of image data that has to be transferred for a series of image pickup operations becomes enormous when relatively large overlapping areas are defined. Since the rate at which image data can be transferred is limited, the intervals of picking up unit images have to be increased when a large volume of image data has to be transferred. Then, the total time necessary for acquiring a panoramic image will inevitably be increased. A camera system that requires a long time for picking up an image of a moving object is not feasible because the quality of the panoramic whole image picked up in a long shooting period is very poor.

If, on the other hand, small overlapping areas are defined, it will not be possible to produce overlapping areas when the camera system is moved slightly incorrectly to make the attempt of acquiring a whole image a complete failure.

In view of the above identified problems of the related art, it is desirable to provide an image pickup apparatus, an image pickup method that can produce a high quality synthesized panoramic image when the user wants to manually regulate the image pickup direction or when it is difficult to highly precisely shift the image pickup direction of the apparatus probably because the motor does not revolve highly accurately.

It is also desirable to provide an image pickup apparatus, an image pickup method and an image pickup program that can realize a commercially available digital camera equipped with a functional feature of being capable of obtaining a high quality panoramic whole image at low cost as well as a recording medium adapted to store images produced by such an image pickup apparatus.

According to the present invention, there is provided an image pickup apparatus for synthetically generating a first image, or a whole image of an entire object of shooting, the apparatus comprising: an image pickup means for sequentially changing the image pickup direction and picking up images of parts of the object of shooting to be imaged; a reading means for reading second images, each having a predetermined width and constituting a part of the image picked up on an imaging plane by the image pickup means; a defining means for defining a reading range of each second image to be read by the reading means; a relative position identifying means for identifying the relative position of each second image relative to the first image; and a synthesizing means for generating the first image by sequentially and synthetically combining the second images read out by the reading means; the defining means being adapted to determine the first quantity of movement of each second image by referring to the relative position thereof as identified by the relative position identifying means and define the reading range of the second image to be read out next according to the first quantity of movement.

According to the present invention, there is also provided an image pickup apparatus for synthetically generating a first image, or a whole image of an entire object of shooting, the apparatus comprising: an image pickup means for sequentially changing the image pickup direction and picking up images of parts of the object of shooting to be imaged; a reading means for reading second images, each having a predetermined width and constituting a part of the image picked up on an imaging plane by the image pickup means; a defining means for defining a reading range of each second image to be read by the reading means; a relative position identifying means for identifying the relative position of each second image relative to the first image; a synthesizing means for generating the first image by sequentially and synthetically combining the second images read out by the reading means; and a detection means for detecting the change in the image pickup direction of the image pickup means; the defining means being adapted to determine the first quantity of movement of each second image according to the change in the image pickup direction as detected by the detection means and define the reading range of the second image to be read out next according to the first quantity of movement.

According to the present invention, there is also provided an image pickup apparatus for synthetically generating a first image, or a whole image of an entire object of shooting, the apparatus having at least: an image pickup means for sequentially changing the image pickup direction and picking up images of parts of the object of shooting to be imaged; and a reading means for reading second images, each having a predetermined width and constituting a part of the image picked up on an imaging plane by the image pickup means; the apparatus comprising: a first cabinet adapted to rotate around a rotary shaft linked thereto so as to sequentially change the image pickup direction of the image pickup means; an electronic circuit including: a defining means for defining a reading range of each second image to be read by the reading means; a synthesizing means for generating the first image by sequentially and synthetically combining the second images read out by the reading means; and a relative position identifying means for identifying the relative position of each second image relative to the first image; a display means for displaying the generated synthesized image; a drive means for driving the rotary shall to revolve; a specifying means for specifying the timing of the start and that of the end of each image pickup session of the image pickup means; a battery for driving the components to operate; and a second cabinet linked to the first cabinet by way of the rotary shaft and adapted to be held by one hand by the user; at least one of the electronic circuit, the display means, the drive means, the specifying means and the battery being arranged in the second cabinet.

According to the present invention, there is provided an image pickup method for synthetically generating a first image, or a whole image of an entire object of shooting, the method comprising: an image pickup step of sequentially changing the image pickup direction and picking up images of parts of the object of shooting to be imaged; a reading step of reading second images, each having a predetermined width and constituting a part of the image picked up on an imaging plane in the image pickup step; a defining step of defining a reading range of each second image to be read in the reading step; a relative position identifying step of identifying the relative position of each second image relative to the first image; and a synthesizing step of generating the first image by sequentially and synthetically combining the second images read out in the reading step; the defining step being adapted to determine the first quantity of movement of each second image by referring to the relative position thereof as identified in the relative position identifying step and define the reading range of the second image to be read out next according to the first quantity of movement.

According to the present invention, there is also provided an image pickup method for synthetically generating a first image, or a whole image of an entire object of shooting, the method comprising: an image pickup step of sequentially changing the image pickup direction and picking up images of parts of the object of shooting to be imaged; a reading step of reading second images, each having a predetermined width and constituting a part of the image picked up on an imaging plane in the image pickup step; a defining step of defining a reading range of each second image to be read by the reading means; a relative position identifying step of identifying the relative position of each second image relative to the first image; a synthesizing step of generating the first image by sequentially and synthetically combining the second images read out in the reading step; and a detection step of detecting the change in the image pickup direction in the image pickup step; the defining step being adapted to determine the first quantity of movement of each second image according to the change in the image pickup direction as detected in the detection step and define the reading range of the second image to be read out next according to the first quantity of movement.

According to the present invention, there is provided a program for causing a computer to execute an image pickup process of synthetically generating a first image, or a whole image of an entire object of shooting, the program comprising: an image pickup step of sequentially changing the image pickup direction and picking up images of parts of the object of shooting to be imaged; a reading step of reading second images, each having a predetermined width and constituting a part of the image picked up on an imaging plane in the image pickup step; a defining step of defining a reading range of each second image to be read in the reading step; a relative position identifying step of identifying the relative position of each second image relative to the first image; and a synthesizing step of generating the first image by sequentially and synthetically combining the second images read out in the reading step; the defining step being adapted to determine the first quantity of movement of each second image by referring to the relative position thereof as identified in the relative position identifying step and define the reading range of the second image to be read out next according to the first quantity of movement.

According to the present invention, there is provided a computer program for causing a computer to execute an image pickup process of synthetically generating a first image, or a whole image of an entire object of shooting, the program comprising: an image pickup step of sequentially changing the image pickup direction and picking up images of parts of the object of shooting to be imaged; a reading step of reading second images, each having a predetermined width and constituting a part of the image picked up on an imaging plane in the image pickup step; a defining step of defining a reading range of each second image to be read by the reading means; a relative position identifying step of identifying the relative position of each second image relative to the first image; a synthesizing step of generating the first image by sequentially and synthetically combining the second images read out in the reading step; and a detection step of detecting the change in the image pickup direction in the image pickup step; the defining step being adapted to determine the first quantity of movement of each second image according to the change in the image pickup direction as detected in the detection step and define the reading range of the second image to be read out next according to the first quantity of movement.

According to the present invention, there is provided a recording medium storing a program for causing a computer to execute an image pickup process of synthetically generating a first image, or a whole image of an entire object of shooting, the program comprising: an image pickup step of sequentially changing the image pickup direction and picking up images of parts of the object of shooting to be imaged; a reading step of reading second images, each having a predetermined width and constituting a part of the image picked up on an imaging plane in the image pickup step; a defining step of defining a reading range of each second image to be read in the reading step; a relative position identifying step of identifying the relative position of each second image relative to the first image; and a synthesizing step of generating the first image by sequentially and synthetically combining the second images read out in the reading step; the defining step being adapted to determine the first quantity of movement of each second image by referring to the relative position thereof as identified in the relative position identifying step and define the reading range of the second image to be read out next according to the first quantity of movement.

According to the present invention, there is provided a recording medium storing a program for causing a computer to execute an image pickup process of synthetically generating a first image, or a whole image of an entire object of shooting, the program comprising: an image pickup step of sequentially changing the image pickup direction and picking up images of parts of the object of shooting to be imaged; a reading step of reading second images, each having a predetermined width and constituting a part of the image picked up on an imaging plane in the image pickup step; a defining step of defining a reading range of each second image to be read by the reading means; a relative position identifying step of identifying the relative position of each second image relative to the first image; a synthesizing step of generating the first image by sequentially and synthetically combining the second images read out in the reading step; and a detection step of detecting the change in the image pickup direction in the image pickup step; the defining step being adapted to determine the first quantity of movement of each second image according to the change in the image pickup direction as detected in the detection step and define the reading range of the second image to be read out next according to the first quantity of movement.

Thus, an image pickup apparatus according to the invention identifies the state of revolution of the image pickup section thereof by determining the relative positional relationship between the position of the first image and that of each second image. Then, it modifies the position of the reading range of the second image by referring to the identified state of revolution. With this arrangement, it is possible to pick up a panoramic image in which discontinuous parts that may arise due to positional displacements are less noticeable even if a moving object is picked up on and/or near any of the boundaries of the images obtained as a result of continuous image pickup sessions and, at the same time, to prevent the possible loss of an overlapping area of the first image and any second image. Besides, an image pickup apparatus according to the invention comprises a first cabinet adapted to rotate around a rotary shaft linked thereto so as to sequentially change the image pickup direction of the image pickup means and a second cabinet containing at least one of the electronic circuit for generating a synthesized image as a result of execution of various processing operations, the display means for displaying the generated synthesized image, the drive means for driving the first cabinet to rotate, the specifying means for specifying the timing of the start and that of the end of each image pickup session of the image pickup means and the battery for driving the components to operate.

With the above described arrangement, it is possible to make the first cabinet contain the minimum indispensable components that are necessary for image pickup operations and reduce the mass of the rotating part of the image pickup apparatus. Then, it is possible to reduce the cost of the rotating components that support the first cabinet and that of the motor for driving the rotating components.

BRIEF DESCRIPTION OF THE DRAWINGS

FIGS. 8A and 8B are schematic illustration illustrations of the two techniques that can be used for the operation of reading out a partial image.

DETAILED DESCRIPTION OF THE PREFERRED EMBODIMENTS

Now, the present invention will be described in greater detail by referring to the accompanying drawings that illustrate preferred embodiments of the invention.

Figure 1:
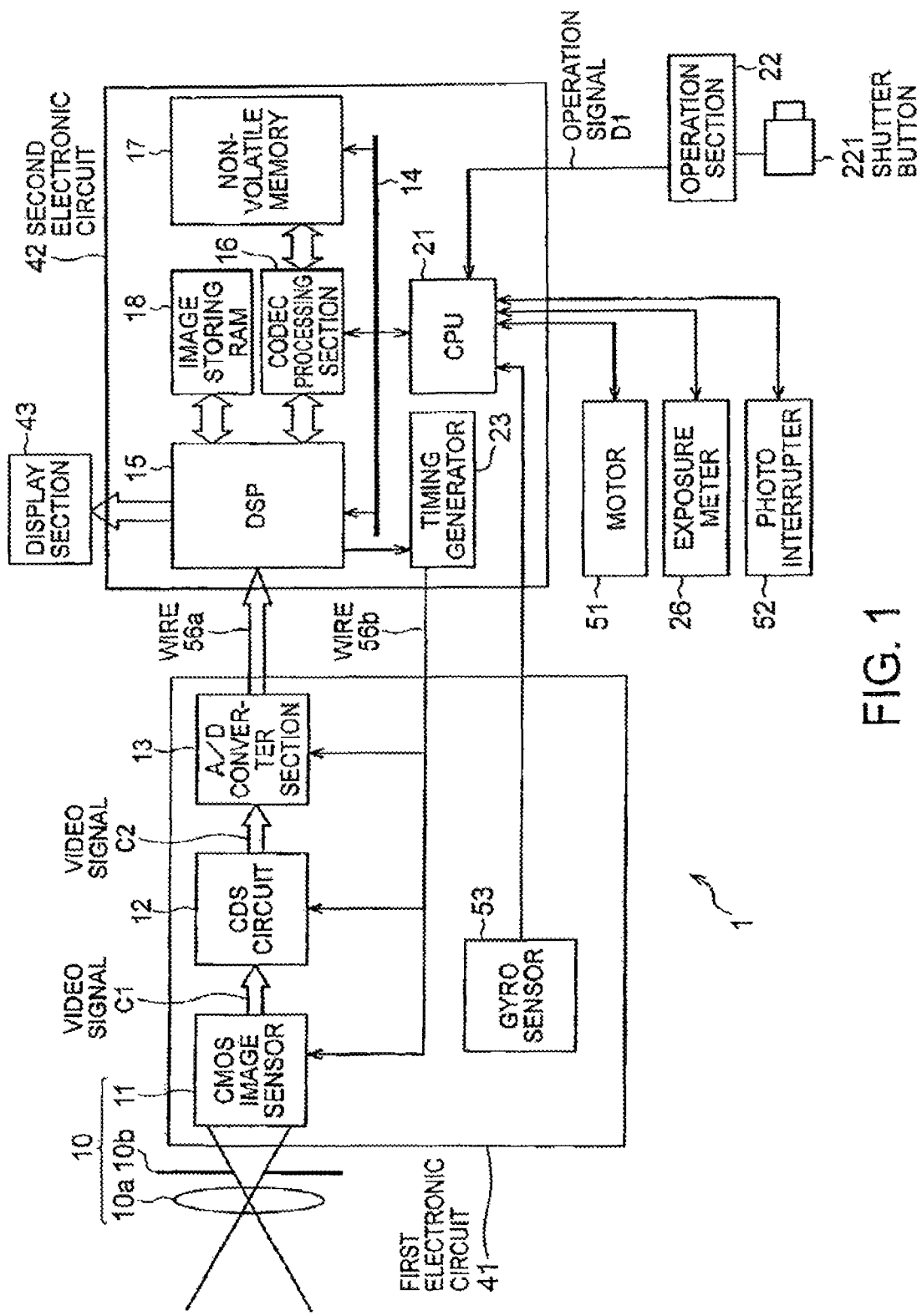
FIG. 1 is a schematic block diagram of the first embodiment of image pickup apparatus for picking up a panoramic image according to the invention.

The present invention is applied to, for example, an image pickup apparatus 1 as shown in FIG. 1.

Referring to FIG. 1, the image pickup apparatus 1 comprises an image pickup section 10 for picking up an image of an object of shooting. The image pickup section 10 includes a lens 10a for focusing rays of light coming from the object to form an image of the object; a diaphragm drive section 10b for regulating the aperture of the lens by means of a shutter blade or the like for blocking the rays of light coming in from the object by way of the lens 10a and a CMOS (complementary metal-oxide semiconductor) image sensor 11 for generating an electric imaging signal C1 according to the input image of the object.

The image pickup apparatus 1 also comprises a CDS (corrected double sampling) circuit 12 for compensating disparities of the imaging signals C1 generated by the CMOS image sensor 11, an A/D converter section 13 for performing an operation of analog/digital conversion on the imaging signal C2, supplied form the CDS circuit 12, a digital signal processor (DSP) 15 for performing a predetermined process on the digitized imaging signal C2 supplied from the A/D converter section 13 as image data, an image storing RAM 18 for temporarily storing image data from the DSP 15 connected to it, a codec processing section 16 for encoding the image data from the connected DSP 15, a nonvolatile memory 17 such as a flush memory for storing the image data supplied from the codec processing section 16, a display section 43 for displaying an image to the user according to the image data supplied from the DSP 15, a CPU (central processing unit) 21 for controlling all the image pickup apparatus 1 by way of an internal bus 14 connected to it, an operation section 22 connected to the CPU 21 so as to be used by the user for various operations, a motor 51, an exposure meter 26, a photo interrupter 52, a gyro sensor 53, the motor 51, the exposure meter 26, the photo interrupter 52 and the gyro sensor 53 being connected to the CPU, and a timing generator 23 for controlling the signal processing system extending from the CMOS image sensor 11 to the A/D converter section 13 according to the control signal transmitted from the DSP 15.

The image pickup section 10 performs an automatic aperture control operation and an automatic focal point control operation according to the operation signal supplied from the CPU 21 by way of the DSP 15 and the timing generator 23. The image pickup section 10 also regulates the image pickup direction of the image pickup apparatus in both horizontally and vertically and the aperture of the diaphragm by opening or closing the shutter blade (not shown) according to the aperture value input to it by way of the operation section 22. The image pickup section 10 is driven to operate by means of the motor 51 that is controlled by the CPU 21.

The CMOS image sensor 11 generates an imaging signal C1 by converting the image of the object of shooting coming in by way of the lens section 10a and the diaphragm drive section 10b into an electric signal and outputs the electric signal to the CDS circuit 12. The CMOS image sensor 11 is adapted to select a partial region of the image of the object formed on the imaging plane thereof and efficiently read out the pixel values of the region.

The CDS circuit 12 removes the noises in the imaging signal C1 supplied from the CMOS image sensor 11 by means of a correlated double sampling circuit or conducts a processing operation for amplifying the gain of the signal and outputs the obtained signal to the A/D converter section 13 as imaging signal C2. The A/D converter section 13 performs an operation of analog/digital conversion on the imaging signal C2 supplied from the CDS circuit 12 and outputs the obtained digital signal to the DSP 15. The timing of each operation of the CDS circuit 12 and that of the A/D converter section 13 are controlled by the timing generator 23 so that images may be continuously taken in at a constant frame rate.

The DSP 15 is a block including a signal processing processor. The image represented by the image signal C2 from the A/D converter section 13 is supplied to the DSP 15 as stream data arranged at a constant frame rate and temporarily stored in the image storing RAM 18 under the control of the timing generator 23. An image processing operation to be carried out on the image stored in the image storing RAM 18 is defined in advance as a preprogrammed operation. The image subjected to an image processing operation by the image storing RAM 18 is transmitted to the codec processing section 16 and/or the display section 43.

The codec processing section 16 compresses the data volume of the image transmitted from the DSP 15 by means of a predetermined method. It may be adapted to compression coding of the data volume according to a given standard such as the related JPEG (Joint Photographic Experts Group) Standard.

The nonvolatile memory 17 is typically formed by a semiconductor memory, a magnetic recording medium or a magneto-optical recording medium. It is a medium for recording the image data compressed by the codec processing section 16 at a predetermined address. The user can transfer the picked up image to some other apparatus such as a PC and enjoy it or perform any of various retrieving operations if the memory 17 is realized by a recording medium that can be removably attached to the image pickup apparatus.

The display section 43 displays the image converted into an analog signal by the D/A converter section (not shown) and then into a video signal by the video encoder section (not shown). The display section 43 may be realized by a liquid crystal display element arranged on a lateral surface of the cabinet of the image pickup apparatus 1 so that the user may confirm what is picked up on a real time basis, while executing an image pickup process him- or herself.

The CPU 21 is connected to a ROM that stores control programs to be executed and a DRAM (not shown) that is used as working area for storing and developing data by way of the internal bus 14 and takes the role of central processing unit for controlling the entire image pickup apparatus 1. The CPU 21 generates an activation signal according to the operation signal D1 supplied from the operation section 22 and the information relating to the lightness of the object of shooting transmitted from the exposure meter 26 and transmits it to the image pickup section 10 by way of the DSP 15 and the timing generator 23.

The operation section 22 includes keys that are to be operated by the user to freely regulate the view angle and the image pickup direction and also freely regulate the aperture value and the exposure time of the image pickup section 10. The operation section 22 generates an operation signal D1 according to the information input by the user and transmits it to the CPU 21. The operation section 22 also includes a shutter button 221 that generates an operation signal D1 for starting or ending an image pickup operation when the shutter button 221 is depressed by the user and transmits it to the CPU 21.

The exposure meter 26 is a sensor that identifies the lightness of the object to be shot by the image pickup section 10 and transmits information on the identified lightness to the CPU 21.

Thus, the object shot by the image pickup apparatus 1 having the above described configuration is then converted into an electric signal, or an imaging signal C1, by the CMOS image sensor 11 and subjected to a noise-removing operation of the CDS circuit 12 to become an imaging signal C2, which is then subjected to an analog/digital conversion process in the A/D converter section 13. The image represented by the imaging signal C2 is stored in the image storing RAM 18 by way of the DSP 15 and subjected to a predetermined image processing operation. Then, it is displayed on the display section 43 or encoded by the codec processing section 16 and stored in the memory 17.

The motor 51 is typically realized by a stepping motor adapted to operate as drive source for driving the image pickup section 10 to rotate. The motor 51 rotates according to the activation signal from the CPU 21. As a result, it is possible to change the image pickup direction of the image pickup section 10 horizontally or vertically.

The photo interrupter 52 is a sensor for determining if the quantity of rotation of the image pickup section 10 is found within the movable range thereof. It transmits the information on the result of determination to the CPU 21.

The gyro sensor 53 is a sensor for detecting the change in the image pickup direction of the image pickup section 10, and transmits the information on the change to the CPU 21.

Figure 2:
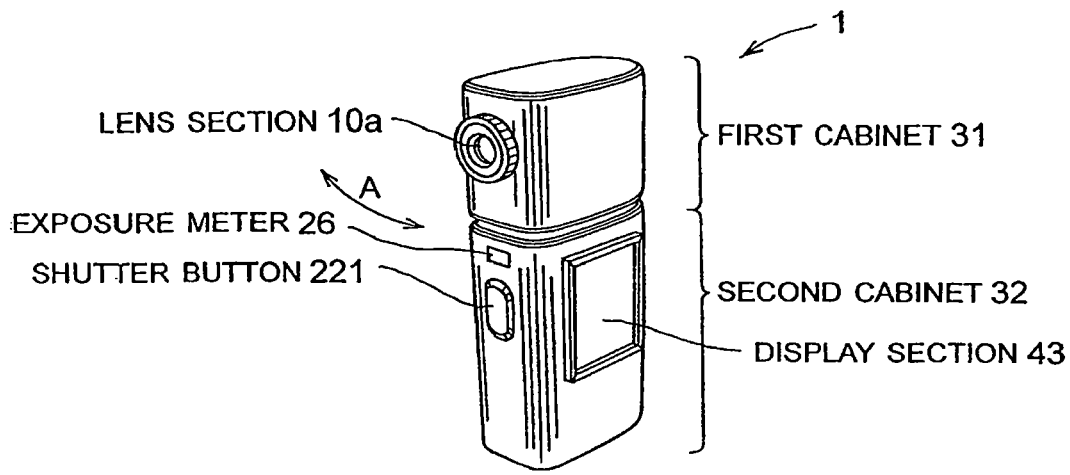
FIG. 2 is a schematic illustration of the appearance of the embodiment of image pickup apparatus of FIG. 1 that is adapted to obtain a panoramic image and has a first cabinet and a second cabinet.

Now, referring now to FIG. 2, the image pickup apparatus 1 comprises a first cabinet 31 that can be rotated in the direction of arrow A around a rotary shaft linked to it to shoot an object by way of the image pickup section 10 that includes a lens section 10a and a second cabinet 32 arranged under the first cabinet 31 and adapted to be held by the user by one hand. The second cabinet 32 is provided with a shutter button 221, the display section 43 for displaying the image picked up by the user so that the user may visually check the picked up image and the exposure meter 26 for metering the lightness of the object of shooting.

Figure 3:
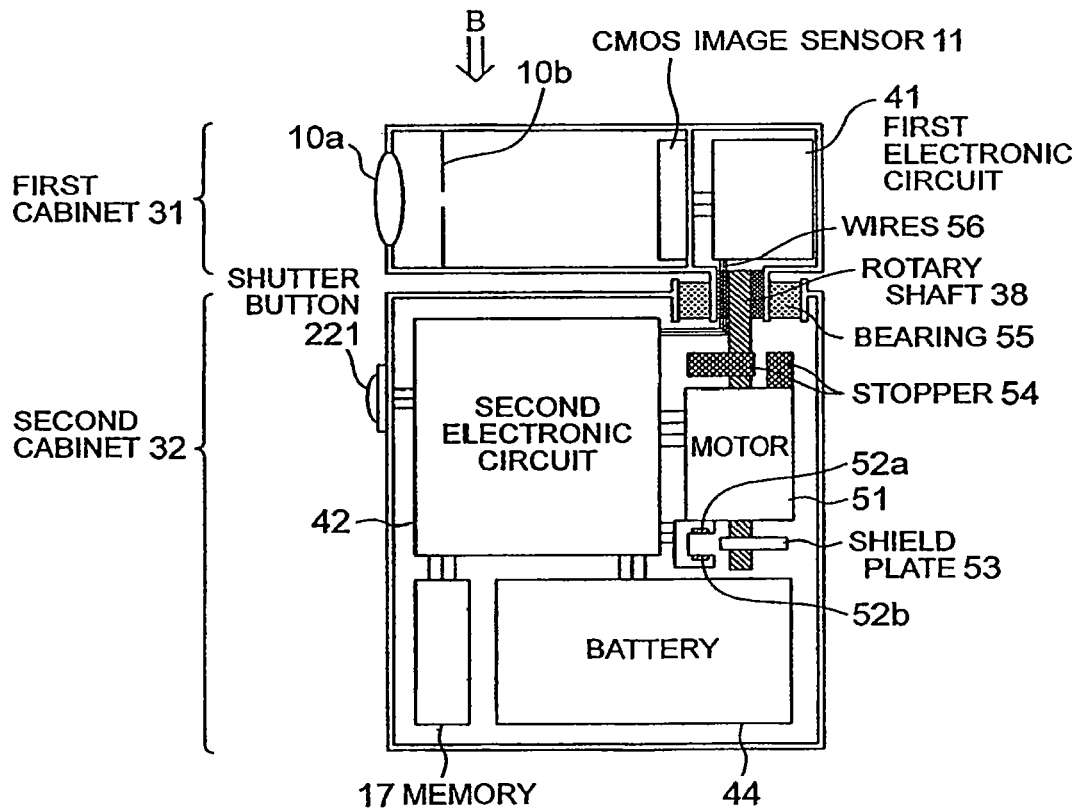
FIG. 3 is a schematic block diagram of the embodiment of image pickup apparatus of FIG. 1, illustrating the internal configuration thereof.

FIG. 3 is a schematic block diagram of the image pickup apparatus 1 of FIG. 1, illustrating the internal configuration thereof. As shown in FIG. 3, the first cabinet 31 includes a lens section 10a, a diaphragm drive section 10b, a CMOS image sensor 11 and a first electronic circuit 41 including at least a CDS circuit 12 and an A/D converter section 13.

The second cabinet 32 is linked to the first cabinet 31 by way of the rotary shaft 38 and includes a motor 51 for driving the rotary shaft 38 to rotate, a photo interrupter 52, a shield plate 53, the photo interrupter 52 and the shield plate 53 being adapted to be used for controlling the rotary angle of the rotary shaft 38, a stopper 54 for physically limiting the rotary motion of the rotary shaft 38, a bearing 55 held in a link hole formed on the top surface of the second cabinet 32 and adapted to realize a smooth rotary motion of the rotary shaft 38 borne by it, a second electronic circuit 42 for controlling the components of the image pickup apparatus 1 and a battery 44 for driving the components of the image pickup apparatus 1.

The second electronic circuit 42 is connected to wires 56 to be used for transmitting electric signals to and receiving electric signals from the first electronic circuit 41. The wires 56 include at least a wire 56a and another wire 56b shown in FIG. 1, which are arranged to transmit electric signals from the second electronic circuit 42 to the first electronic circuit 41 and vice versa. Preferably, data are digitally transmitted between the two electronic circuits.

While the gyro sensor 53 is arranged on the first electronic circuit 41 in the first cabinet 31 that is housed in the cabinet along with the image pickup section 10, it is technically possible to arrange it on the second electronic circuit 42 in the second cabinet 32 for the purpose of reducing the mass of the first cabinet 31. Note that the gyro sensor 53 is not indispensable to the present invention and hence it may be omitted from the image pickup apparatus 1.

In addition to the above listed components, the second cabinet 32 also includes a button for selecting an ordinary image mode and a panoramic image mode and other various buttons that ordinary digital cameras have.

The motor 51 is typically realized by a stepping motor adapted to drive the rotary shaft 38 at an angular velocity corresponding to the drive pulse supplied to it. The rotary shaft 38 that is driven to rotate by the motor 51 is linked at an end thereof to the first cabinet 31 and the stopper 54 is rigidly fitted to it at a middle part thereof. The shield plate 53 is rigidly fitted to the other end of the rotary shaft 38. Thus, the first cabinet 31 is driven to rotate by the motor 51 along with the shield plate 53 and the stopper 54 due to the rotary motion of the rotary shaft 38. The relative displacement of the rotary shaft 38 produced by the motor 51 can be detected by the number of pulses applied to the motor 51.

The display section 43 includes the D/A converter section (not shown), the video encoder section (not shown) and is adapted to display the generated image by way of the liquid crystal display element arranged at a lateral surface of the second cabinet 32. Since the display section 43 is separated from the first cabinet 31 that is driven to rotate by the rotary shaft 38, it is not affected by the rotary motion of the rotary shaft 38 and hence provides a good visibility to the user.

The photo interrupter 52 includes a light emitting body 52a and a light receiving body 52b arranged below the light emitting body. While the light receiving body 52b keeps on receiving the optical signal coming from the light emitting body 52a, the optical signal is hidden by the shield plate 53 when the shield plate 53 is turned to come close to the photo interrupter 52 by the rotary motion of the rotary shaft 38. Thus, the rotary position of the rotary shaft 38 can be identified on the basis of the hidden state of the optical signal received by the light receiving body 52b.

Figure 4:
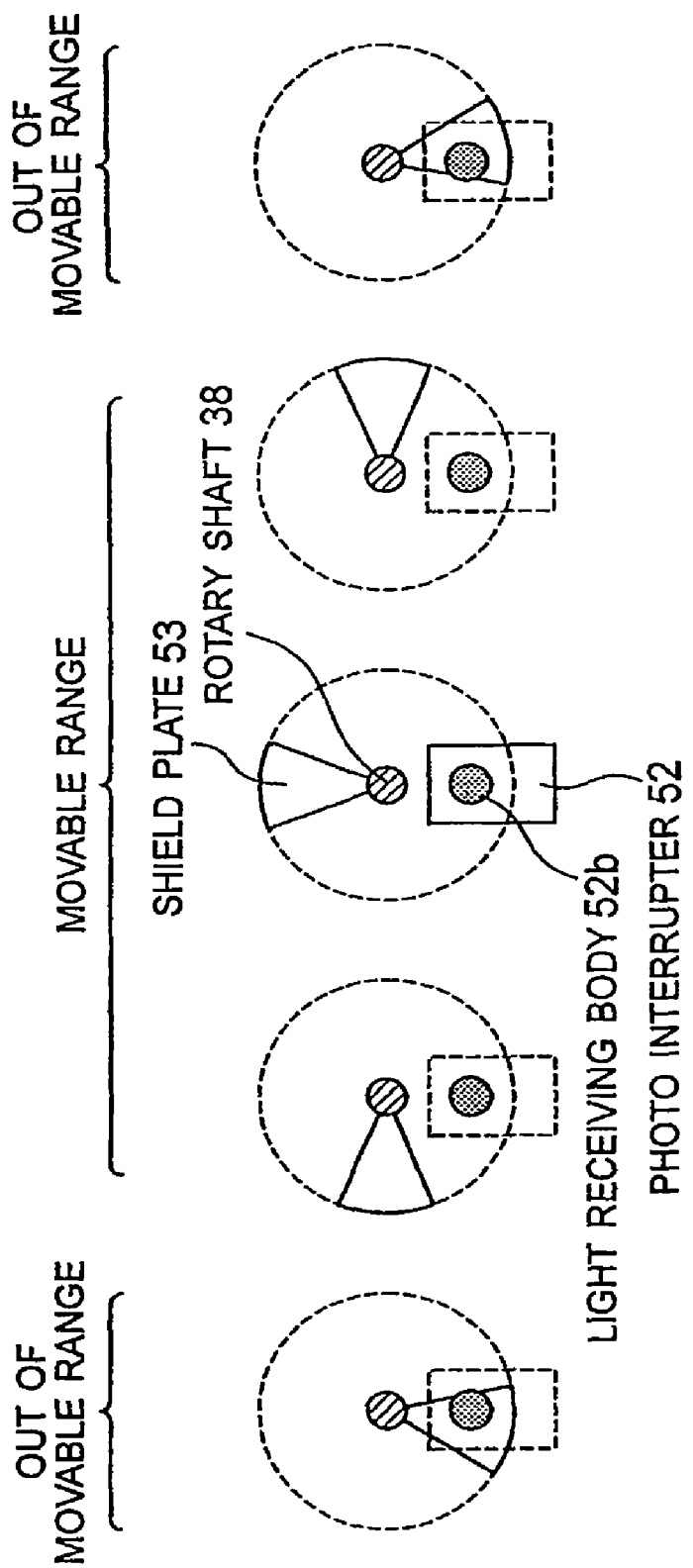
FIG. 4 is a schematic illustration of the method of controlling the rotary motion of the first cabinet by means of a photo interrupter.

It may be so arranged that, when the rotary shaft 38 is driven to rotate beyond the movable range and the optical signal is blocked by the shield plate 53, the motor 51 is stopped in response to the obstruction. FIG. 4 illustrates the photo interrupter 52 and the shield plate 53 as viewed in the direction of B in FIG. 3. As seen from FIG. 4, the motor 51 is not stopped and hence it is possible to freely rotate the rotary shaft 38 in the movable range because the optical signal to be received by the light receiving body 52b is not blocked by the shield plate 53 in the movable range. On the other hand, the optical signal to be received by the light receiving body 52b is blocked by the shield plate 53 and hence the motor 51 is stopped when the rotary shaft 38 is driven to rotate beyond the movable range. It may additionally be so arranged that the rotary motion of the first cabinet 31 is physically suppressed by means of a stopper 54 when the rotary shaft 38 is driven to rotate beyond the movable range.

As a result of introducing an arrangement for limiting the rotary range of the first cabinet 31 relative to the second cabinet 32, it is possible to transmit data from the first cabinet 31 to the second cabinet 32 by means of flexible wires that are popularly being used for ordinary movable objects without using a photo-coupler and related special joint members.

The user can shoot an object of shooting by means of the embodiment of image pickup apparatus 1 according to the invention and having the above-described configuration, holding the second cabinet 32 by one hand. The user can specify the timing of starting a shooting operation and that of ending the shooting operation by depressing the shutter button 221 arranged outside the second cabinet 32. Since the shutter button 221 is located at a position that the user can touch it easily by a finger tip of the hand holding the second cabinet 32, the user can give a command for starting a shooting operation and a command for ending a shooting operation only by slightly moving the finger tip.

Figures 5A, 5B, 5C:
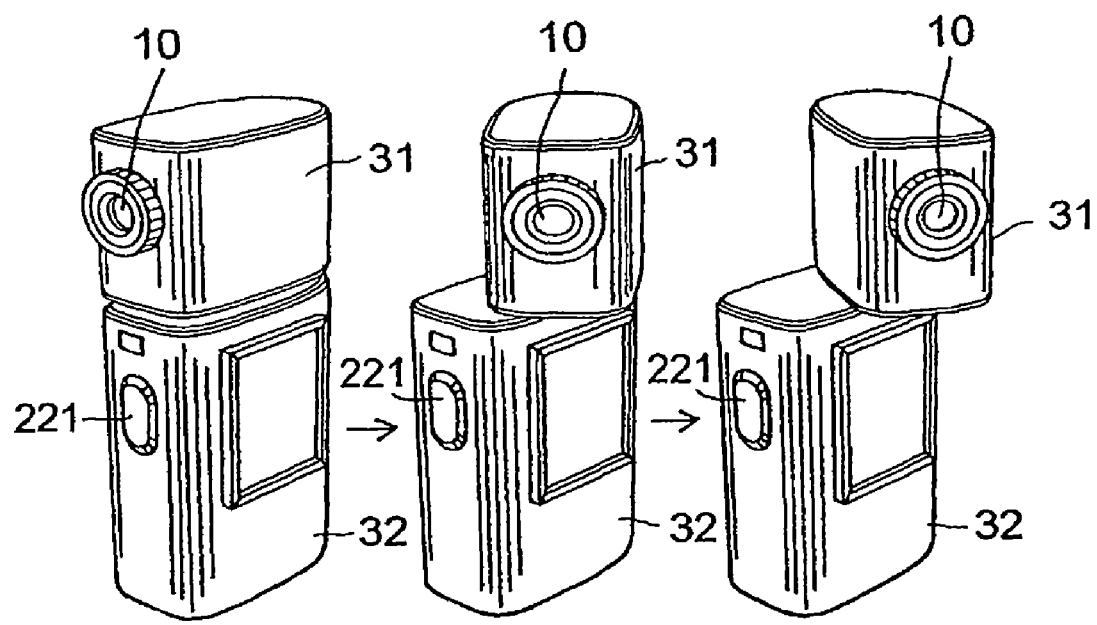
FIGS. 5A, 5B and 5C are schematic illustrations of the embodiment of image pickup apparatus of FIG. 1, showing how the first cabinet is driven to gradually rotate by depressing the shutter button.

Thus, as the user holds the second cabinet 32 by one hand and depresses the shutter button 221 by a finger tip, the first cabinet 31 gradually rotates from a state as shown in FIG. 5A to a state as shown in FIG. 5B so as to shift the image pickup direction of the image pickup section 10. As the user keeps on depressing the shutter button 221, the first cabinet 31 rotates to further shift the image pickup direction as shown in FIG. 5C. In other words, the first cabinet 31 is designed to rotate around the rotary shaft 38 that is linked to it in order to gradually shift the image pickup direction of the image pickup section 10.

Figure 6:
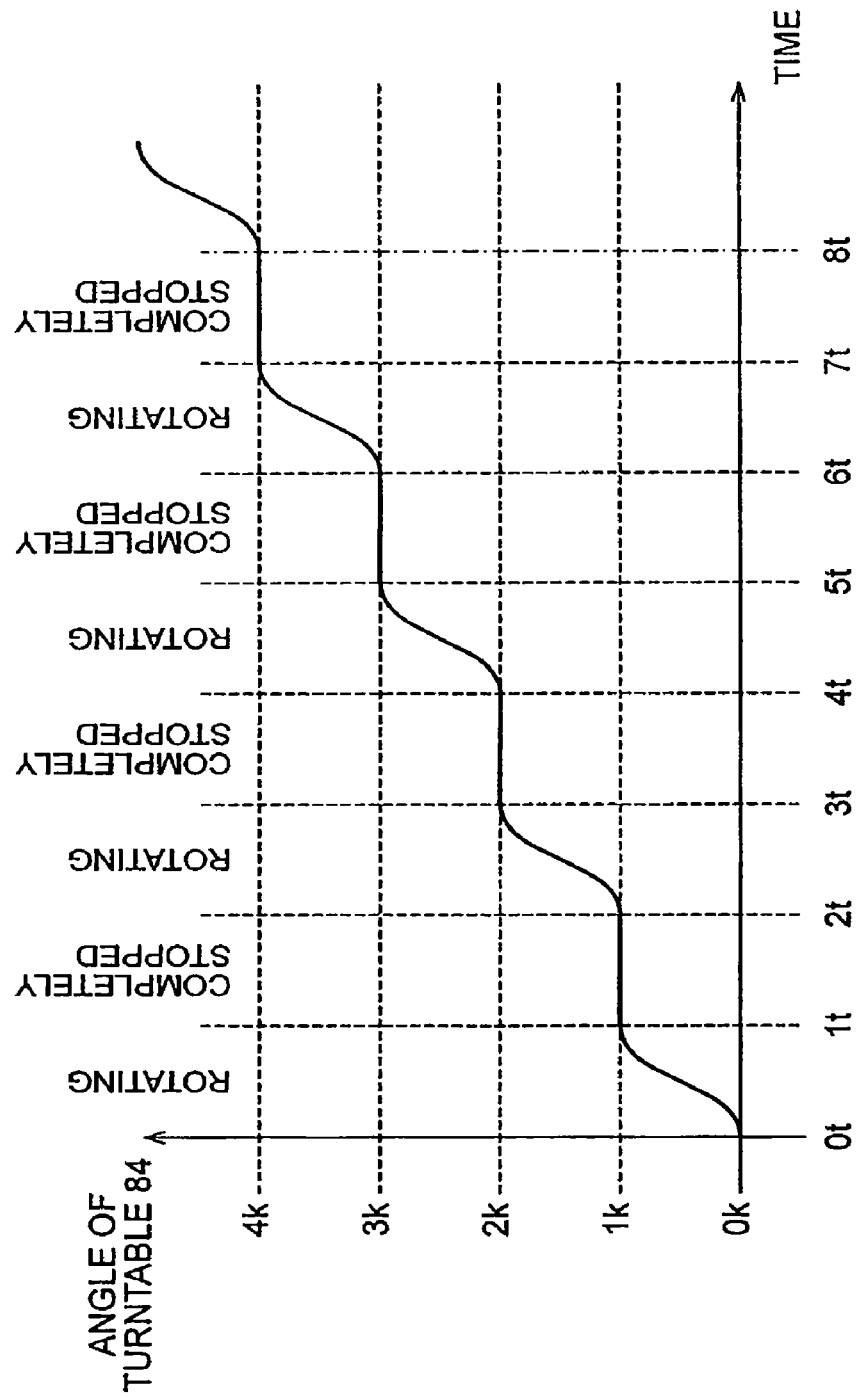
FIG. 6 is a graph illustrating the relationship between the rotary position of the first cabinet and the elapsed time.

FIG. 6 is a graph illustrating the relationship between the rotary position of the first cabinet 31 and the elapsed time. As seen from FIG. 6, the first cabinet 31 is driven by the motor 51 to rotate by $k°$ per $t$ seconds and completely stopped at the end of the $t$ seconds. Since the object of shooting is shot when the first cabinet 31 is completely stopped, it is possible to pick up a clear image that is free from blurs.

If the user keeps on depressing the shutter button 221 in the state as illustrated in FIG. 5C, the rotary motion of the motor 51 is suppressed by the above described photo interrupter 52 before the first cabinet 31 is completely stopped. It may be so arranged that the first cabinet 31 is driven to rotate in the opposite direction.

The second cabinet 32 contains massive components such as the battery 44 and the motor 51 and the second electronic circuit 42 comprising a large number of circuits. On the other hand, the first cabinet 31 contains less massive components such as the lens section 10a, the CMOS image sensor 11 and the first electronic circuit 41 that are necessary for shooting operations. In short, the first cabinet 31 is less heavy than the second cabinet 32. Therefore, it is possible to reduce the mechanical load of the components necessary for driving the first cabinet 31 to rotate such as the rotary shaft 38, the bearing 55 as well as the motor 51. Thus, it is possible to realize a commercially feasible digital camera having a functional feature of taking a high quality panoramic picture at low cast.

Now, the image pickup operation, or the shooting operation, of the image pickup apparatus 1 of this embodiment will be described below specifically.

Figure 7:
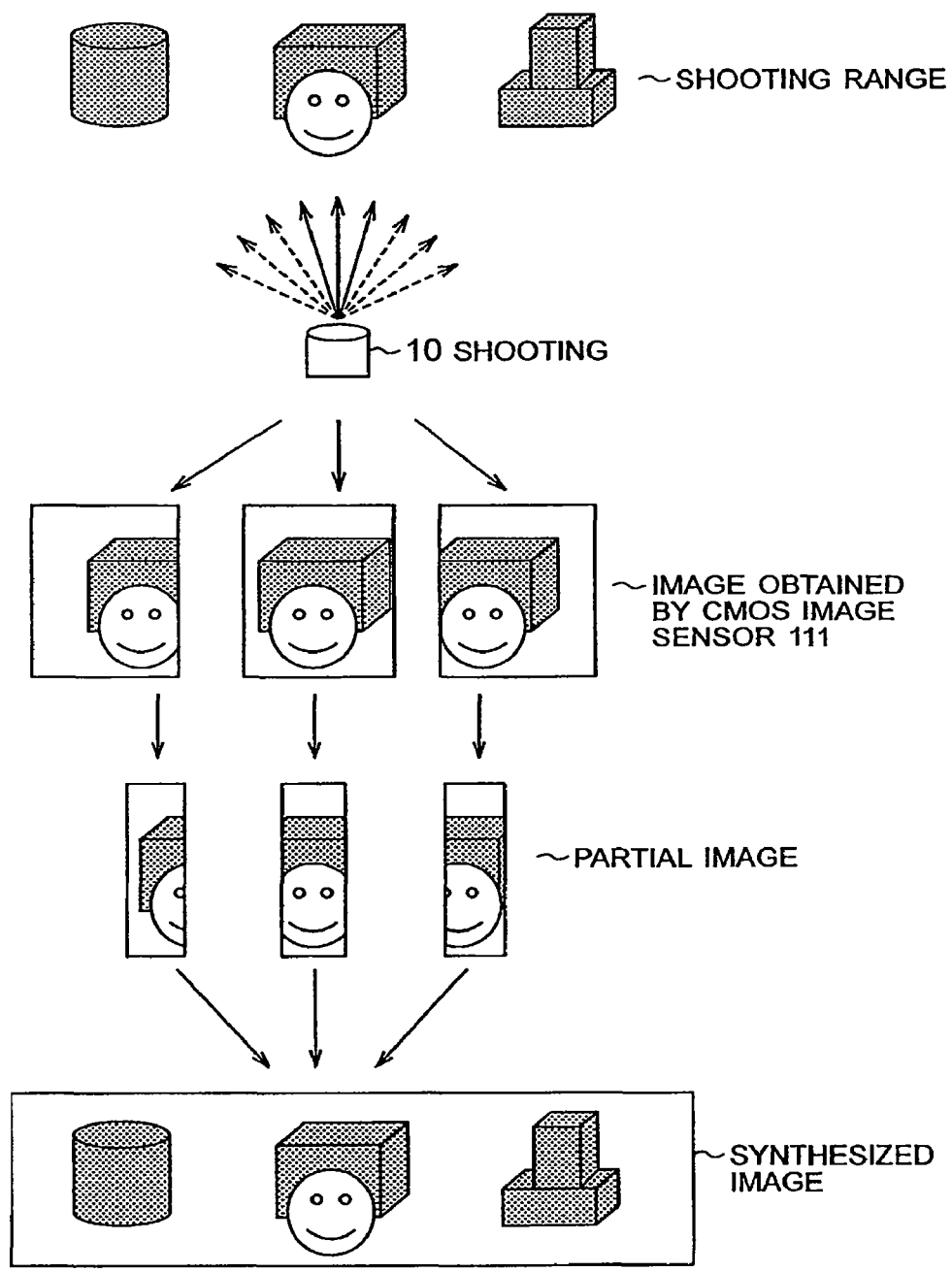
FIG. 7 is a schematic illustration of the operation of synthesizing a panoramic wide image by partly overlapping the partial images that are read out form the imaging pickup plane.

Assume here that FIG. 7 illustrates the target of shooting. Partial images of the target are obtained on the imaging plane of the CMOS sensor 11 as the target is shot, while horizontally gradually shifting the image pickup direction of the image pickup section 10 of the first cabinet 31. Then, a partial image (second image) having a predetermined width is read out for each of the obtained partial images. When reading out the second image, the CPU 21 has to define the range of the partial image on the imaging plane from which the second image is read out. The second images are necessary for forming a synthesized panoramic image. Then, the second images are pasted together with overlapping areas to produce a synthesized image. It is also possible to paste a newly shot image and the existing synthesized image to produce a new synthesized image. The second images can be accurately put together with overlapping areas by determining the relative displacement of the images in such a way that the pixel values of the overlapping areas of the partial images are properly correlated.

FIGS. 8A and 8B schematically illustrate two techniques for reading second images from the picked up images. The rays of light coming in from the object of shooting enter the image pickup apparatus 1 by way of the lens section 10a and the diaphragm drive section 10b and are focused on the imaging plane of the CMOS image sensor 11 to form an image of the object there. Note that the image pickup apparatus 1 is adapted to use both the technique of reading out the pixel values of all the region of the formed image of the object and transferring them to the image storing RAM 18 as shown in FIG. 8A and the technique of selecting a strip-shaped region as part of the formed image and efficiently reading out only the pixel values of the selected region and transferring them to the image storing RAM 18 as shown in FIG. 8B. The technique shown in FIG. 8B involves the concept of the image pickup operation described above by referring to FIG. 7. It is characterized by an image region covering a relatively small area from which the pixel values are read out and hence the relatively small amount of image data to be transferred if compared with the technique shown in FIG. 8A.

Figure 9A:
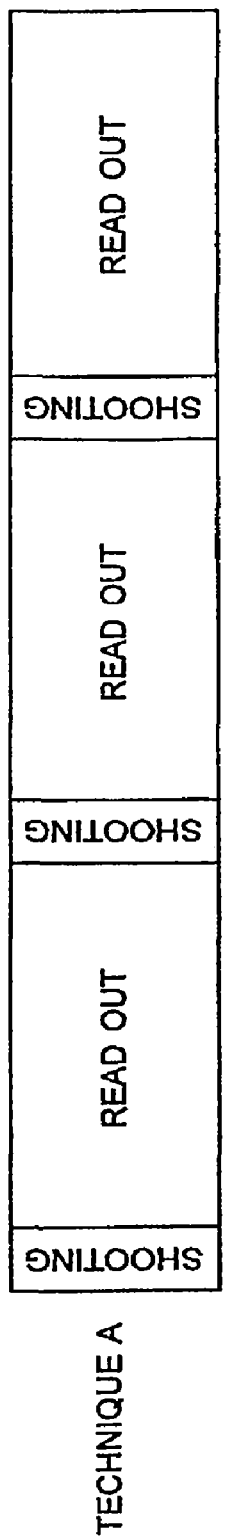
FIGS. 9A and 9B are schematic diagrams illustrating the relationship between the shooting time and the time required to read the pixel values of the techniques A and B.
Figure 9B:
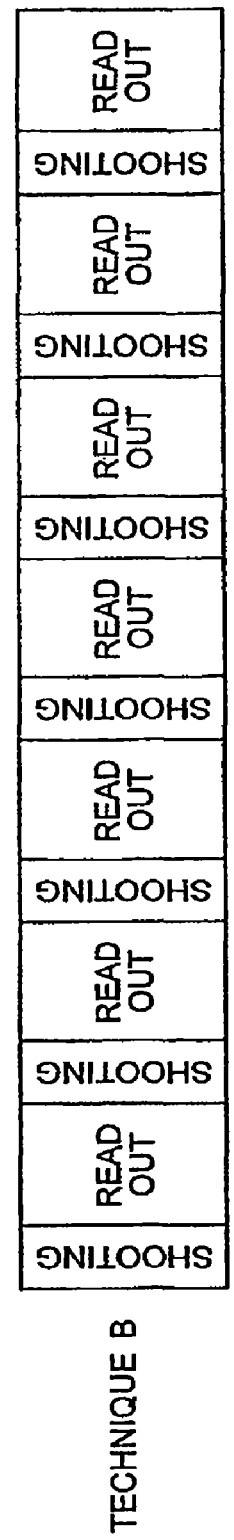

FIGS. 9A and 9B illustrate the relationship between the shooting time and the time required to read the pixel values of each of the techniques A and B. More specifically, since the time that has to be spent to read the pixel values can be reduced when the amount of image data to be transferred is small, it is possible to increase the number of times of shooting operation that can be carried out per unit time. In other words, when shooting a moving object, the technique that involves short shooting time intervals can be effectively employed to reduce any discontinuity in the picked up image as shown in FIG. 9B. It will be appreciated that the scenic range to be shot, or the total area to be shot, is the same for both FIGS. 9A and 9B. In other words, the volume size of the total image data, or the total amount of image data to be transferred, is same for the techniques shown in both FIGS. 9A and 9B.

However, the technique shown in FIG. 9B can reduce the amount of image data to be transferred at a time if compared with the technique shown in FIG. 9A. Thus, it is possible for the technique in FIG. 9B to start picking up a next image when the corresponding image data is read out from the imaging plane so that it is possible to use short shooting time intervals. As a result, it is possible to minimize the positional displacement of the moving object along the seam of adjacent strip-shaped images that can take place due to the time lag between the shooting time of one of the two images and that of the other image. Additionally, since the total area to be shot and hence the total amount of image data to be transferred is same for both the technique shown in FIGS. 9A and 9B, the cost of the entire hardware including the image pickup apparatus 1 does not vary significantly between the two techniques.

Now, the sequence of operation of extracting second images and producing a synthesized image by using the technique B of the image pickup apparatus 1 of this embodiment will be described below.

Figure 10:
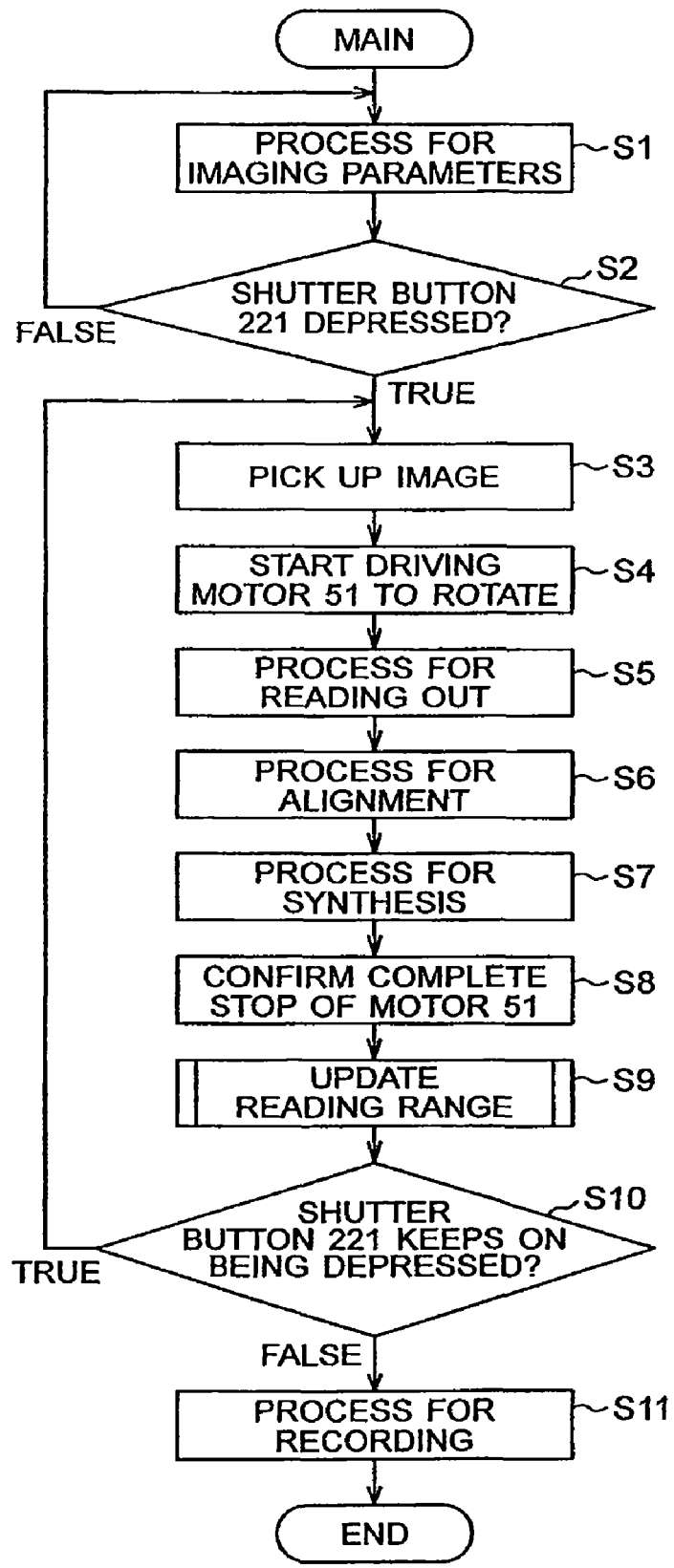
FIG. 10 is a flow chart of the sequence of an image pickup process of the image pickup apparatus according to the invention, using technique B.

Firstly, the image pickup apparatus 1 diagnoses and initializes the hardware and then proceeds to Step S1 in FIG. 10, where it computes various imaging parameters. More specifically, in Step S1, the image pickup apparatus 1 acquires information on the lightness of the object of shooting as identified by the exposure meter 26 and computes the imaging parameters including the aperture value and the shutter speed of the image pickup apparatus. Above all, the image pickup apparatus 1 firstly observes the lightness I of the object of shooting by means of the exposure meter 26. The information on the lightness I is transmitted to the CPU 21. The CPU 21 also receives the operation signal D1 transmitted from the operation section 22. The operation signal D1 includes all or some of the parameters input by the user by way of the operation section 22 including either or both of the aperture value A and the exposure time S. The user can select specific values for the respective imaging parameters as in the case of the manual mode of ordinary cameras. Alternatively, the user can have the CPU 21 determine the values of some of the imaging parameters as variables as in the case of the automatic mode of ordinary cameras. Thus, appropriate values will be selected for the respective imaging parameters.

Then, the operation proceeds to Step S2, where the timing of starting an image pickup operation is identified depending on if the shutter button 221 is depressed and an operation signal D1 is generated by the operation section 22 in response to the depression of the shutter button 221. If the generation of such an operation signal D1 is identified, the operation proceeds to Step S3. On the other hand, if no generation of such an operation signal D1 is identified, the operation returns to Step S1 to repeat the above steps.

Then, in Step S3, the image pickup section 10 regulates the diaphragm drive section 10b by referring to the imaging parameters determined in Step S1 and executes an image pickup operation.

Then, the operation proceeds to Step S4, where the motor 51 is driven to rotate the first cabinet 31 relative to the second cabinet 32 in order to slightly shift the image pickup direction of the image pickup section 10. The quantity of rotation of the first cabinet 31 is so regulated as to produce overlapping areas at least in the partial images that are picked up continuously. The quantity of rotation can be determined in advance by means of geometrical computations at the time of designing the image pickup apparatus 1. Alternatively, the image pickup apparatus 1 may be provided with a functional feature of detecting the quantity of the swinging motion of the apparatus in the shooting operation so as to dynamically and finely adjust the quantity of rotation of the first cabinet 31. A small quantity of rotation of the motor 51 may be selected and the number of images to be picked up per unit time may be increased for continuous shooting in Step S4 in order to minimize the distortion of the object of shooting that can be produced by parallax and the discontinuity of the partial images that can appear when the object of shooting contains one or more than one moving objects. Then, it is possible to synthetically produce a high quality whole image. It is necessary to control the motor 51 so as to drive it to rotate intermittently and highly precisely for such a shooting operation. However, since the first cabinet 31 is much lighter than the second cabinet 32, it is possible to control the motor 51 accurately in the above described manner at low cost. The image pickup direction of the image pickup section 10 is shifted horizontally as an example in the following description of the procedure.

The operation proceeds to Step S5, where partial images are read out of the CMOS image sensor 11. More specifically, each partial image of the object of shooting produced on the imaging plane is converted into an electric signal by the CMOS image sensor 11 and a reading range is defined as part of the imaging plane so that the pixel values of the region of the reading range is read out to produce an imaging signal C1. The produced imaging signals C1 are sequentially converted into imaging signals C2 and stored in the image storing RAM 18 that is connected to the DSP 15. Note that the reading range is updated in Step S9, which will be described hereinafter, each time an image is picked up.

Then, the operation proceeds to Step S6, where an alignment process of computing the relative displacement between the partial image that is newly picked up and extracted in the above described Step S5 and stored in the image storing RAM 18 and the synthesized image formed by using the partial images that have been picked up and extracted in the preceding image pickup sessions. In the alignment process, for example, the correlation value of the synthesized image and the partial image may be determined by gradually shifting the relative positions of the two images and the positions that maximize the correlation value may be identified to determine the relative displacement. The relative displacement may be determined by means of the Lucase-Kanade method or the block matching method that are well known in the technical field under consideration. Alternatively, the relative displacement of the partial image extracted in the last image pickup session and the newly extracted partial image may be determined in place of determining the relative displacement of the partial image and the synthesized image. The two techniques of determining the relative displacement are technically equivalent in many cases.

Then, the operation proceeds to Step S7, wherein a synthesized image is produced by sequentially laying the obtained partial images one on the other to make them partly overlap with each other and pasting them together. As shown in FIG. 7, the synthesized image is produced by sequentially extracting each of the partial images from the corresponding image formed on the imaging plane of the CMOS image sensor 11 and pasting the partial images together. The relative displacement as determined in the above described alignment process in Step 6 is taken into consideration when placing the partial images to overlap with each other at right positions and pasting them together. Any technique adapted to smoothly link two images may be used for placing the partial images to overlap with each other and pasting them together. Alternatively, the alpha blending process may be used.

Subsequently, the operation proceeds to Step S8, where the CPU 21 makes sure if the motor 51 has terminated the predetermined rotary motion that started in Step S4 and is at a complete halt or not. If, as a result, it is found that the motor 51 is at a complete halt, the operation proceeds to the next step, or Step S9.

Figure 11:
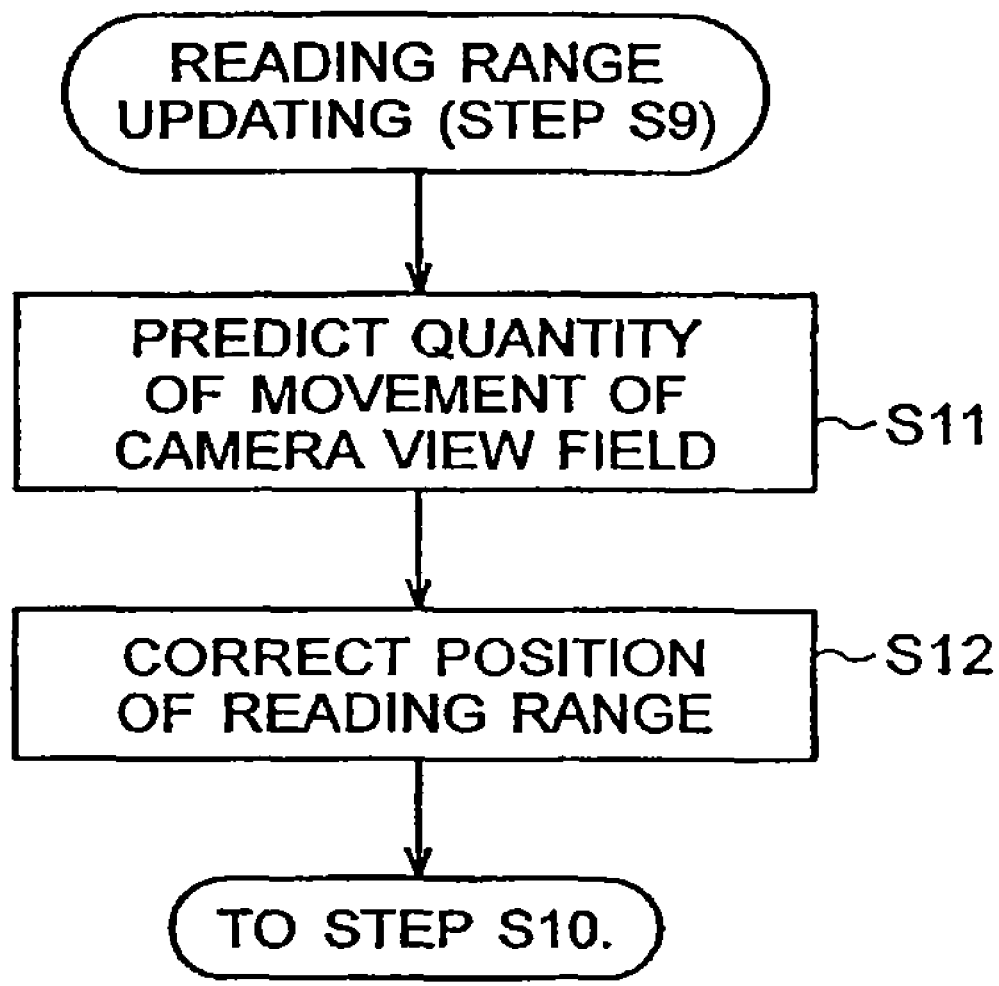
FIG. 11 is a flow chart of the operation of updating the reading range of Step S9 in FIG. 10, illustrating the sequence of the operation in detail.

In Step S9, the CPU 21 updates the reading range of the partial image that is formed on the imaging plane of the CMOS image sensor 11 as part of the image of the object of shooting to be formed. The image data that correspond to the reading range of the partial image to be laid on the synthesized image in a partly overlapping manner and pasted together are specified in this step. If the partial image and the synthesized image do not have any overlapping area, the alignment process can end in failure. Then, the image pickup operation itself can end in failure. Therefore, the reading range is appropriately specified in Step S9 to avoid such a failure. The following computational operation is conducted in order to appropriately specify the reading range. FIG. 11 is a flow chart of the operation of updating the reading range of Step S9 in FIG. 10, illustrating the sequence of the operation in detail.

Firstly, the operation moves to Step S12, wherein the quantity of movement of the camera view field is predicted in terms of the coordinate system of the synthesized image. The quantity of movement may be predicted in a manner as described below. If the quantity of movement of the camera view field between the last image pickup session and the image pickup session immediately before the last is $v_{k-1}$ and the predicted quantity of movement is $v_k$, the predicted quantity of movement $v_k$ is determined by formula (1) shown below.

$$v_k = v_{k-1} \tag{1}$$

The known quantity of movement $v_{k-1}$ may be determined typically by referring to the relative displacement obtained as a result of the alignment process of Step S6. Alternatively, a series of past quantities of movement $v_{k-2}, v_{k-3}, \ldots$ may be used along with a known filter f( ) that can be used for smoothing data and prediction.

$$v_k = f(v_{k-1}, v_{k-2}, v_{k-3}, \ldots) \tag{2}$$

Note that it is assumed here that the past quantities are initialized as $v_o = V, v_{k-1} = V, v_{k-2} = V, \ldots$ (where V is an appropriately predicted quantity of movement) in Step S1.

The technique for determining the predicted quantity of movement $v_k$ is not limited to the above described one. For example, the predicted quantity of movement $v_k$ may be determined on the basis of the output value of the gyro sensor 53. In such a case again, a known filter may be used for smoothing data and prediction.

The coordinate system that is used for expressing the predicted quantity of movement is not limited to that of the synthesized image. For example, there may be an arrangement where a synthesized image is not formed each time a partial image is picked up and the partial image is stored in the recording medium without any modification. With such an arrangement, it will be clear that the predicted quantity of movement can be computationally determined by using a coordinate system that is related to the past partial images and/or the newly obtained partial image.

Then, in the next step, or Step S13, the position $p_k$ of reading range is corrected. If the width of the reading range is W and the position of the reading range at the last image pickup session is $p_{k-1}$, the position $p_k$ has to be determined under a condition that varies depending on the value of $v_k$ in a manner as shown below. Note that it is assumed here that the value of $p_k$ is initialized as $p_k = 0$ in Step S1.

If it is predicted that the camera view field is turning right ($0 < v_k$), the position $p_k$ of the reading range is corrected by means of either formula (3) or formula (4) below.

When $W < v_k$, $$p_k = p_k - v_k + W \tag{3}$$

When $0 < v_k \leq W$, $$p_k = \min(p_k - v_k + W, 0) \tag{4}$$

Figure 12A:
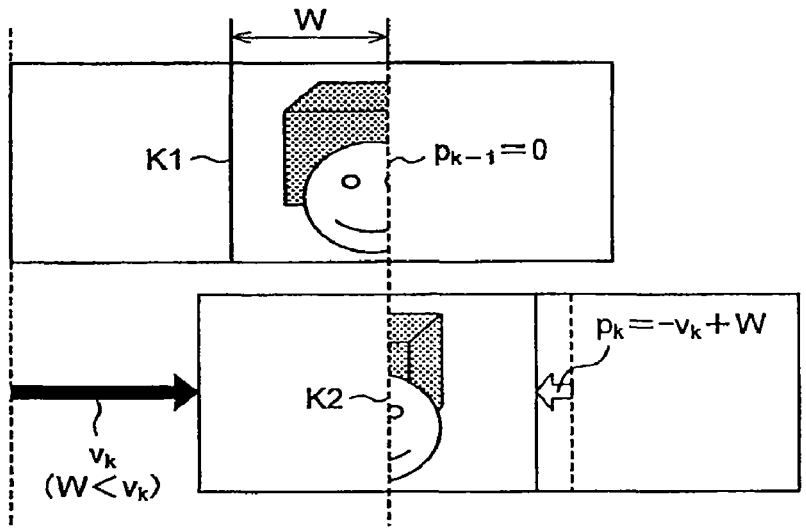
FIGS. 12A and 12B are schematic illustrations of techniques of correcting the reading range.
Figure 12B:
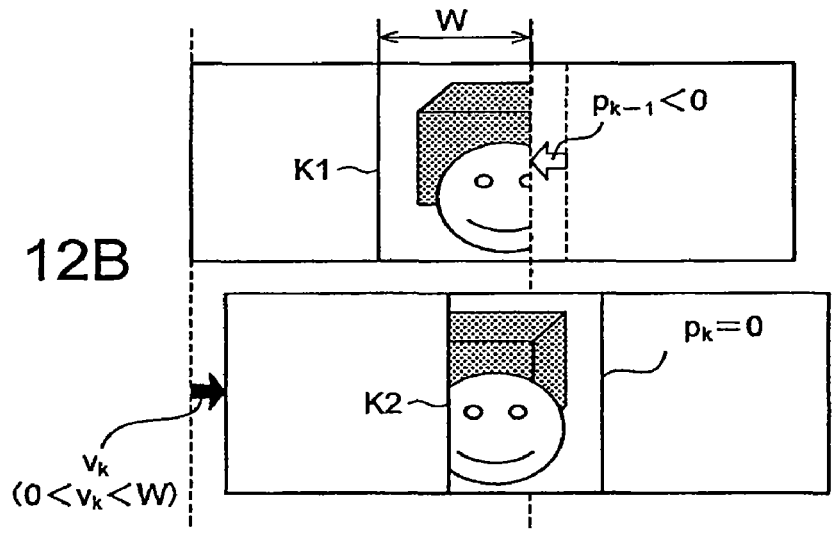
Figure 13:
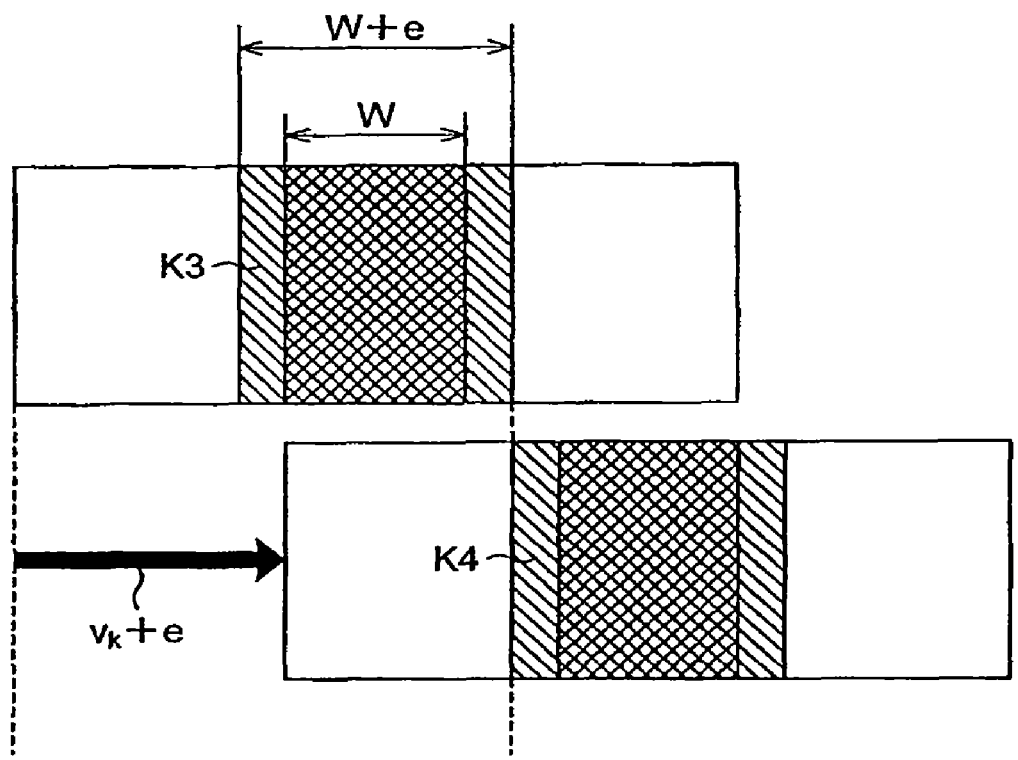
FIG. 13 is a schematic illustration of an operation of expanding the reading range, taking fluctuations in the predicted quality of movement in consideration.

FIG. 12A illustrates the technique of using the formula (3) for correcting the position when $W < v_k$. In this case, since the predicted quantity of movement $v_k$ is large relative to the width W of the reading range, a gap is produced between the partial image K1 that is extracted in the past as part of the synthesized image and the newly extracted partial image K2 if the reading range is moved left. Thus, the trouble of producing a gap between the partial image K1 that is extracted earlier as part of the synthesized image and the newly extracted partial image K2 is avoided by correcting the position of the reading range to $p_k=-\upsilon_k+W$, using the above formula (3). FIG. 12B illustrates the technique of using the formula (4) for correcting the position when $0<\upsilon_k\leq W$. In this case, since the predicted quantity of movement $\upsilon_k$ is small relative to the width W of the reading range, it is possible to correct the position $p_k$ of the reading range, using the above formula (4), and put back the position of the reading range that is moved left to the side of the initial position ($p_0=0$). Thus, it is possible to avoid the trouble that the reading range partly goes out of the imaging plane of the CMOS image sensor 11. In short, the above formulas (3) and (4) tell that the position of the reading range is updated on the basis of the magnitude relationship between the predicted quantity of movement and the width of the reading range. As pointed out above, it is possible to avoid the trouble of producing a gap between the synthesized image that is extracted earlier and the newly extracted partial image and the trouble that the reading range partly goes out of the imaging plane of the CMOS image sensor 11 when the camera view field if turning right.

Similarly, if it is predicted that the camera view field is turning left ($\upsilon_k\leq 0$), the position $p_k$ of the reading range is corrected by means of either formula (5) or formula (6) below.

When $-W<\upsilon_k\leq 0$, $$p_k=\max(p_{k-1}-\upsilon_k-W,0) \qquad (5)$$

When $\upsilon_k\leq -W$ $$p_k=p_{k-1}-\upsilon_k-W \qquad (6)$$

Thus, it is possible to avoid the trouble of producing a gap between the synthesized image that is extracted earlier and the newly extracted partial image and the trouble that the reading range partly goes out of the imaging plane of the CMOS image sensor 11 when the camera view field if turning left.

While the reading range that is part of the imaging plane of the CMOS image sensor 11 has a width of W in the above description, it is actually expanded by a predetermined value of e to make the width equal to W+e in the reading process of Step S5. This is because the predicted quantity of movement $\upsilon_k$ that is used in Step S13 is a predicted value after all and hence it is appropriate to assume that the actual quantity of movement can fluctuate to a certain extent in the real environment where the image pickup apparatus is operated. Thus, if the actual quantity of movement is assumed to be equal to $\upsilon_k\pm e$, it is possible to avoid the trouble of producing a gap between the partial image K3 that is extracted earlier as part of the synthesized image and the newly extracted partial image K4 by expanding the width of the reading range to W+e even when the actual quantity of movement is $\upsilon_k+e$, which is the worst presumable value.

Thus, the operation of Step S9 is described in detail above. As a result of carrying out the operation of Step S9, it is now possible to avoid a situation where the synthesized image that is extracted earlier and the newly extracted partial image do not have any overlapping area if the image pickup section 10 is turned right or left excessively due to an uneven rotary motion of the motor 51 or a camera shake by updating the reading range in Step S9, which includes Steps S12 and 13. In other words, it is now possible to avoid an image pickup operation from ending in failure due to the loss of an overlapping area.

To date, when the rotary motion of the image pickup section 10 fluctuates due to an uneven rotary motion of the motor 51, the fluctuations are corrected normally by thoroughly controlling the image pickup direction of the image pickup section 10 and the rotary motion of the motor 51. However, such a control technique can raise the cost of the control system and the mechanical system. To the contrary, since a reading range is defined for extracting a partial image in an image pickup apparatus 1 according to the invention and the position of the reading range is modified depending on the rotary motion of the image pickup section 10 as identified by the above described technique, it is now possible to efficiently avoid any failure in the image pickup operation at low cost.

Then, the operation of the image pickup section 10 proceeds to Step S10, where it is checked if the shutter button 221 of the operation section 22 is still being depressed or not by way of the operation signal D1 and the timing of ending the shooting operation is identified. If it is found that the shutter button 221 is still being depressed, the image pickup section 10 returns to Step S3 in order to continue the image pickup operation and keeps on shooting the object of shooting. If, on the other hand, it is identified that the shutter button 221 is freed from the depressed state, the image pickup section 10 proceeds to Step S11 in order to carry out a process for ending the image pickup operation.

In Step S11, the codec processing section 16 encodes the image data of the synthesized panoramic image and stores them in the memory 17.

Now, the logical processing blocks of the image pickup apparatus 1 for extracting partial images by means of the technique B and forming a synthesized image will be described by referring to FIG. 14. Note that the logical processing blocks represent conceptual functions that can be obtained by following the operation procedure of FIG. 10 by means of the hardware illustrated in FIG. 1.

Figure 14:
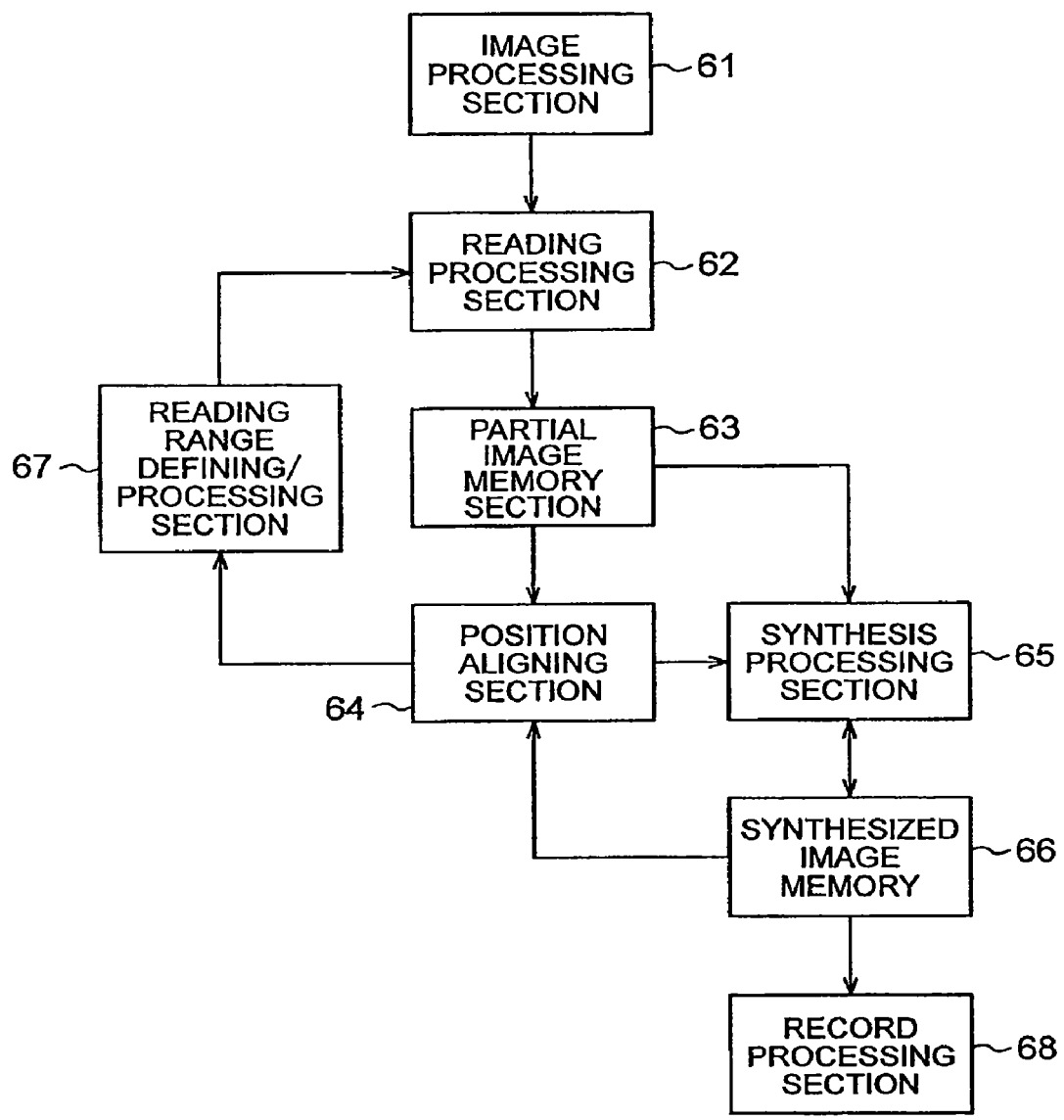
FIG. 14 is a schematic block diagram of the logical functional blocks of an image pickup apparatus according to the invention to be used for picking up an image, using technique B.

Referring to FIG. 14, image processing section (image pickup means) 61 is realized by the CMOS image sensor 11. It picks up an image by way of the above described Step S3.

Reading processing section (reading means) 62 is realized by the hardware blocks from the CMOS image sensor 11 to the DSP 15 and a program to be executed by the DSP 15. It reads the image data specified for a reading range by the reading range defining/processing section 67 in the above described Step S5 and stores them in partial image memory section 63.

The partial image (second image) memory section 63 is realized by the image storage RAM 18. It stores partial images.

Position aligning section (relative position identifying means) 64 is realized by a program to be executed by the DSP 15. It determines the relative displacement between the partial image stored in the partial image memory section 63 in the above described Step S6 and the synthesized image stored in synthesized image memory section 66.

The synthesis processing section (synthesizing means) 65 is realized by a program to be executed by the DSP 15. It synthetically combines the partial images stored in the partial image memory section 63 and the synthesized image stored in synthesized image memory section 66, taking the relative displacement as determined by the position aligning section 64 in the above described Step S7, and stores the newly synthesized image in the synthesized image memory section 66.

The synthesized image (first image) memory section 66 is realized by the image storing RAM 18. It stores synthesized images.

The reading range defining/processing section 67 is realized by a program to be executed by the DSP 15. It determines the predicted quantity of movement of the camera view field by referring to the relative displacement as determined by the position aligning section 64 in the above described Step S9 and updates the reading range.

Record processing section 68 is realized by the codec processing section 16, the nonvolatile memory 17, the DSP 15 and a program to be executed by the DSP 15. The record processing section 68 carries out an encoding processing operation conforming to the corresponding JPEG Standard that is suitable for recording the synthesized image in the above described Step S11 and stores the encoded data in the nonvolatile memory 17.

As the program for forming the above-described logical functional blocks is stored in a ROM and the image pickup apparatus 1 is equipped with the ROM, it is possible to embody the present invention by means of software. Thus, it is possible to apply the present invention to a recording medium that stores such software.

Finally, the characteristic features of the present invention will be reiterated below. In a situation where the image pickup section 10 of an image pickup apparatus 1 according to the invention is apt to swing relative to the space to be shot by the image pickup apparatus 1 as in the case where the motor does not operate precisely and can rotate unevenly or in the case where the user is holding the image pickup apparatus 1 by hand and operating it, it defines a reading range that is adapted to the situation. As a result, it is possible to avoid the possible loss of an overlapping area of the synthesized image and the partial image due to the swing without excessively increasing the area of the reading rang. Additionally, since the intervals of image pickup operations can be reduced, it is possible to improve the temporal continuity of the partial images that are to be laid one on the other and pasted together. Thus, it is possible to form a synthesized panoramic image of an object of shooting that is moving.

In an image pickup apparatus 1 according to the invention, the quantity of the shift of the image pickup direction of the image pickup section 10 may be regulated on the basis of the predicted quantity of movement $υ_k$ for purposes other than optimizing the defined reading range. In such a case, the process of optimizing the defined reading range may be used for fine adjustment against a camera shake, while the process of regulating the image pickup direction of the image pickup section 10 may be used for rough adjustment against the camera shake.

While the operation of the embodiment of image pickup apparatus is described above in terms of an operation of horizontally moving the image pickup direction, the operation is by no means limited thereto. In other words, the above description also applies to an operation of vertically moving the image pickup direction of the image pickup apparatus.

As the second cabinet 32 that is separated from the first cabinet 31 is provided with the shutter button 221, the user can start and end an image pickup operation only by moving a finger tip to a small extent. Additionally, since the second cabinet 32 is provided with the display section 43, the image pickup apparatus offers an improved visibility to the user for the picked up image.

Still additionally, since only the components that are minimally indispensable for image pickup operations such as the lens section 10a and the CMOS image sensor 11 are contained in the first cabinet 31 that is actually driven to rotate, the mass of the rotating part of the image pickup apparatus is minimized. Thus, the cost of the parts which are necessary for supporting the rotating components of the first cabinet 31 and that of the motor 51 for driving those components can be reduced because of the reduced mass. Furthermore, since the components that operate as drive source of the motor 51 are mounted in the second cabinet 32 that is held by hand by the user, the influence of the possible vibrations of the image pickup apparatus due to the rotary motion of the motor 51 is minimized.

Additionally, since the rotary range of the first cabinet 31 is limited by means of the photo interrupter 52, it is possible to transmit data from the rotating part to the hand-held part of the image pickup apparatus and vice versa by way of flexible wires that are made of less costly materials.

Still additionally, the image pickup apparatus 1 according to the present invention is by no means limited to the above-described embodiment. For the purpose of the present invention, it is only necessary that at least one of the DSP 15, the CPU 21, the display section 43, the motor 51, the operation section 22 (shutter button 221) and the battery 44 is contained in the second cabinet 32.

For the purpose of the present invention, an image pickup method as described below may be used in combination. With the image pickup method, images, each constituting a part of the shooting range, or the object of shooting, are picked up sequentially on an imaging plane by sequentially changing the image pickup direction and the images picked up in the image pickup step are read out to produce partial images having overlapping areas for two or more than two partial images, each partial image constituting a part of the image on the imaging plane, out of the images picked up on the imaging plane. Subsequently, the read out partial images are sequentially laid one on the other to produce a synthesized image of the entire shooting range, or the object of shooting. As a result of laying two or more than two images one on the other, it is possible to uniformly distribute the noise components of the synthesized image and consequently improve the image quality of the generated panoramic whole image.

While the above described image pickup method differs from an image pickup method according to the invention in terms of the timing of driving the motor to rotate relative to the timing of each image pickup operation, the step of sequentially picking up images, each constituting a part of the shooting range, or the object of shooting, on an imaging plane by sequentially changing the image pickup direction and the step of reading the images picked up in the image pickup step to produce partial images having overlapping areas, each partial image constituting a part of the image on the imaging plane, out of the images picked up on the imaging plane are common to the both methods. Therefore, it may be clear that the above described image pickup method also falls within the scope of the present invention in terms of that a synthesized image of the entire shooting range, or the object of shooting is produced by sequentially laying the read out images one on the other. In other words, the noise components of the synthesized image can be uniformly distributed to improve the image quality of the generated panoramic whole image.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus for synthetically generating a first image, or a whole image of an entire object of shooting, the apparatus comprising:
   an image pickup section for sequentially changing an image pickup direction and picking up images of parts of the object of shooting to be imaged;

a reading section for reading second images, each having a predetermined width and constituting a part of at least one of the images picked up on an imaging plane by the image pickup section;
a defining section for defining a reading range of each second image to be read by the reading section;
a relative position identifying section for identifying the relative position of each second image relative to the first image; and
a synthesizing section for generating the first image by sequentially and synthetically combining the second images read out by the reading section, wherein:
the defining section is adapted to:
   determine a first quantity of movement of each second image by referring to the relative position thereof as identified by the relative position identifying section and define the reading range of the second image to be read out next according to the first quantity of movement, and
   determine a center position of the reading range of each second image according to the magnitude relationship between the first quantity of movement and the reading range; and
the image pickup section is adapted to:
   obtain information indicative of a completion of an image pickup operation; and
   generate an instruction to encode data associated with the synthesized first image, in response to the obtained information.

2. The apparatus according to claim 1, wherein the image pickup section regulates the quantity of the change in the image pickup direction according to the first quantity of movement as determined by the defining section.

3. The apparatus according to claim 1, wherein the image pickup section picks up the next image at the time when an image is read by the reading section.

4. The apparatus of claim 1, wherein the information indicative of the completion of the image pickup operation comprises information indicative of a state of a shutter button associated with the apparatus.

5. The apparatus of claim 4, wherein the image pickup section is further configured to:
determine, based on the obtained information, whether the shutter button fails to be in a depressed state; and
generate the instruction to encode data associated with the synthesized first image, in response to the determination.

6. An image pickup apparatus for synthetically generating a first image, or a whole image of an entire object of shooting, the apparatus comprising:
an image pickup section for sequentially changing an image pickup direction and picking up images of parts of the object of shooting to be imaged;
a reading section for reading second images, each having a predetermined width and constituting a part of at least one of the images picked up on an imaging plane by the image pickup section;
a defining section for defining a reading range of each second image to be read by the reading section;
a relative position identifying section for identifying the relative position of each second image relative to the first image;
a synthesizing section for generating the first image by sequentially and synthetically combining the second images read out by the reading section; and
a detection section for detecting the change in the image pickup direction of the image pickup section, wherein:
the defining section is adapted to:
   determine a first quantity of movement of each second image according to the change in the image pickup direction as detected by the detection section and define the reading range of the second image to be read out next according to the first quantity of movement, and
   determine a center position of the reading range of each second image according to the magnitude relationship between the first quantity of movement and the reading range; and
the image pickup section is adapted to:
   obtain information indicative of a completion of an image pickup operation; and
   generate an instruction to encode data associated with the synthesized first image, in response to the obtained information.

7. The apparatus according to claim 6, wherein the image pickup section regulates the quantity of the change in the image pickup direction according to the first quantity of movement as determined by the defining section.

8. The apparatus according to claim 6, wherein the image pickup section picks up the next image at the time when an image is read by the reading section.

9. An image pickup apparatus for synthetically generating a first image, or a whole image of an entire object of shooting, the apparatus having at least:
an image pickup section for sequentially changing an image pickup direction and picking up images of parts of the object of shooting to be imaged; and
a reading section for reading second images, each having a predetermined width and constituting a part of at least one of the image images picked up on an imaging plane by the image pickup section, the apparatus comprising:
a first cabinet adapted to rotate around a rotary shaft linked thereto so as to sequentially change the image pickup direction of the image pickup;
an electronic circuit including:
   defining section for defining a reading range of each second image to be read by the reading section;
   synthesizing-section for generating the first image by sequentially and synthetically combining the second images read out by the reading section; and
   relative position identifying section for identifying the relative position of each second image relative to the first image;
a display section for displaying the generated synthesized image;
a drive section for driving the rotary shaft to revolve;
a specifying section for specifying the timing of the start and that of the end of each image pickup session of the image pickup section;
a battery for driving the components to operate; and
a second cabinet linked to the first cabinet by way of the rotary shaft and adapted to be held by one hand by the user, at least one of the electronic circuit, the display section, the drive section, the specifying section and the battery being arranged in the second cabinet,
wherein:
the defining section is adapted to:
   determine a first quantity of movement of each second image by referring to the relative position thereof as identified by the relative position identifying section and define the reading range of the second image to be read out next according to the first quantity of movement, and determine a center position of the reading range of each second image according to the magnitude relationship between the first quantity of movement and the reading range and the image pickup section is adapted to:

obtain, from the specifying section, information indicative of the end of at least one of the image pickup sessions; and generate an instruction to encode data associated with the synthesized first image, in response to the obtained information.

10. The apparatus according to claim 9, wherein the drive section includes a control mechanism for limiting the rotary angle of the rotary shaft to a predetermined angular range.

11. An image pickup method for synthetically generating a first image, or a whole image of an entire object of shooting, the method comprising:

an image pickup step of sequentially changing an image pickup direction and picking up images of parts of the object of shooting to be imaged;

a reading step of reading second images, each having a predetermined width and constituting a part of at least one of the images picked up on an imaging plane in the image pickup step;

a defining step of defining a reading range of each second image to be read in the reading step;

a relative position identifying step of identifying the relative position of each second image relative to the first image; and a synthesizing step of generating the first image by sequentially and synthetically combining the second images read out in the reading step;

the reading step being adapted to determine a first quantity of movement of each second image by referring to the relative position thereof as identified by the relative position identifying section and define the reading range of the second image to be read out next according to the first quantity of movement, wherein:

the defining step is adapted to define a center position of the reading range of each second image according to the magnitude relationship between the first quantity of movement and the reading range; and the image pickup step comprises obtaining information indicative of a completion of an image pickup operation and, in response to the obtained information, generating an instruction to encode data associated with the synthesized first image.

12. The method according to claim 11, wherein the image pickup step is adapted to regulate the quantity of the change in the image pickup direction according to the relative position as identified in the relative position identifying step.

13. The method according to claim 11, wherein the image pickup step is adapted to pick up the next image at the time when an image is read in the reading step.

14. An image pickup method for synthetically generating a first image, or a whole image of an entire object of shooting, the method comprising:

an image pickup step of sequentially changing an image pickup direction and picking up images of parts of the object of shooting to be imaged;

a reading step of reading second images, each having a predetermined width and constituting a part of at least one of the images picked up on an imaging plane in the image pickup step;

a defining step of defining a reading range of each second image to be read in the reading step;

a relative position identifying step of identifying the relative position of each second image relative to the first image;

a synthesizing step of generating the first image by sequentially and synthetically combining the second images read out in the reading step; and a detection step of detecting the change in the image pickup direction in the image pickup step;

the defining step being adapted to determine a first quantity of movement of each second image according to the change in the image pickup direction as detected in the detection step and define the reading range of the second image to be read out next according to the first quantity of movement, wherein:

the defining step is adapted to define a center position of the reading range of each second image according to the magnitude relationship between the first quantity of movement and the reading range; and the image pickup step comprises obtaining information indicative of a completion of an image pickup operation and, in response to the obtained information, generating an instruction to encode data associated with the synthesized first image.

15. The method according to claim 14, wherein the image pickup step is adapted to regulate the quantity of the change in the image pickup direction according to the relative position as identified in the relative position identifying step.

16. The method according to claim 14, wherein the image pickup step is adapted to pick up the next image at the time when an image is read in the reading step.

17. A non-transitory computer readable medium having stored thereon a program, which, when executed by a processor causes a computer to execute an image pickup process of synthetically generating a first image, or a whole image of an entire object of shooting, the program comprising:

an image pickup step of sequentially changing an image pickup direction and picking up images of parts of the object of shooting to be imaged;

a reading step of reading second images, each having a predetermined width and constituting a part of at least one of the images picked up on an imaging plane in the image pickup step;

a defining step of defining a reading range of each second image to be read in the reading step;

a relative position identifying step of identifying the relative position of each second image relative to the first image; and a synthesizing step of generating the first image by sequentially and synthetically combining the second images read out in the reading step, wherein:

the defining step is adapted to:

determine a first quantity of movement of each second image by referring to the relative position thereof as identified in the relative position identifying step and define the reading range of the second image to be read out next according to the first quantity of movement, and determine a center position of the reading range of each second image according to the magnitude relationship between the first quantity of movement and the reading range; and the image pickup step is adapted to:
obtain information indicative of a completion of an image pickup operation; and
generate an instruction to encode data associated with the synthesized first image, in response to the obtained information.

18. A non-transitory computer readable medium having stored thereon a program, which, when executed by a processor causes a computer to execute an image pickup process of synthetically generating a first image, or a whole image of an entire object of shooting, the program comprising:
an image pickup step of sequentially changing an image pickup direction and picking up images of parts of the object of shooting to be imaged;
a reading step of reading second images, each having a predetermined width and constituting a part of at least one of the images picked up on an imaging plane in the image pickup step;
a defining step of defining a reading range of each second image to be read in the reading step;
a relative position identifying step of identifying the relative position of each second image relative to the first image;
a synthesizing step of generating the first image by sequentially and synthetically combining the second images read out in the reading step; and
a detection step of detecting the change in the image pickup direction in the image pickup step, wherein:
the defining step is adapted to:
determine a first quantity of movement of each second image according to the change in the image pickup direction as detected in the detection step and define the reading range of the second image to be read out next according to the first quantity of movement, and
determine a center position of the reading range of each second image according to the magnitude relationship between the first quantity of movement and the reading range; and
the image pickup step is adapted to:
obtain information indicative of a completion of an image pickup operation; and
generate an instruction to encode data associated with the synthesized first image, in response to the obtained information.

19. A non-transitory recording medium storing a program for causing a computer to execute an image pickup process of synthetically generating a first image, or a whole image of an entire object of shooting, the program comprising:
an image pickup step of sequentially changing an image pickup direction and picking up images of parts of the object of shooting to be imaged;
a reading step of reading second images, each having a predetermined width and constituting a part of at least one of the images picked up on an imaging plane in the image pickup step;
a defining step of defining a reading range of each second image to be read in the reading step;
a relative position identifying step of identifying the relative position of each second image relative to the first image; and
a synthesizing step of generating the first image by sequentially and synthetically combining the second images read out in the reading step, wherein:
the defining step is adapted to:
determine a first quantity of movement of each second image by referring to the relative position thereof as identified in the relative position identifying step and define the reading range of the second image to be read out next according to the first quantity of movement, and
determine a center position of the reading range of each second image according to the magnitude relationship between the first quantity of movement and the reading range; and
the image pickup step is adapted to:
obtain information indicative of a completion of an image pickup operation; and
generate an instruction to encode data associated with the synthesized first image, in response to the obtained information.

20. A non-transitory recording medium storing a program for causing a computer to execute an image pickup process of synthetically generating a first image, or a whole image of an entire object of shooting, the program comprising:
an image pickup step of sequentially changing the image pickup direction and picking up images of parts of the object of shooting to be imaged;
a reading step of reading second images, each having a predetermined width and constituting a part of the image picked up on an imaging plane in the image pickup step;
a defining step of defining a reading range of each second image to be read in the reading step;
a relative position identifying step of identifying the relative position of each second image relative to the first image;
a synthesizing step of generating the first image by sequentially and synthetically combining the second images read out in the reading step; and
a detection step of detecting the change in the image pickup direction in the image pickup step, wherein:
the defining step is adapted to:
determine a first quantity of movement of each second image according to the change in the image pickup direction as detected in the detection step and define the reading range of the second image to be read out next according to the first quantity of movement, and
determine a center position of the reading range of each second image according to the magnitude relationship between the first quantity of movement and the reading range; and
the image pickup step is adapted to:
obtain information indicative of a completion of an image pickup operation; and
generate an instruction to encode data associated with the synthesized first image, in response to the obtained information.

21. An image pickup apparatus for synthetically generating a first image, or a whole image of an entire object of shooting, the apparatus comprising:
an image pickup section that sequentially changes an image pickup direction and picks up section of images of the object of shooting to be imaged;
a reading section that reads second images, each having a predetermined width and constituting a part of at least one of the images picked up on an imaging plane in the image pickup section;
a defining section that defines a reading range of each second image to be read by the reading section;
a relative position identifying section that identifies the relative position of each second image relative to the first image; and a synthesizing section that generates the first image by sequentially and synthetically combining the second images read out by the reading section, wherein:
the defining section is adapted to:
determine a first quantity of movement of each second image by referring to the relative position thereof as identified by the relative position identifying section and define the reading range of the second image to be read out next according to the first quantity of movement, and
determine a center position of the reading range of each second image according to the magnitude relationship between the first quantity of movement and the reading range; and
the image pickup section is adapted to:
obtain information indicative of a completion of an image pickup operation; and
generate an instruction to encode data associated with the synthesized first image, in response to the obtained information.

22. An image pickup apparatus for synthetically generating a first image, or a whole image of an entire object of shooting, the apparatus comprising:
an image pickup section that sequentially changes an image pickup direction and picks up images of parts of the object of shooting to be imaged;
a reading section that reads second images, each having a predetermined width and constituting a part of at least one of the images picked up on an imaging plane in the image pickup section;
a defining section that defines a reading range of each second image to be read by the reading section;
a relative position identifying section that identifies the relative position of each second image relative to the first image;
a synthesizing section that generates the first image by sequentially and synthetically combining the second images read out by the reading section; and
a detection section that detects the change in the image pickup direction of the image pickup section, wherein:
the defining section is adapted to:
determine a first quantity of movement of each second image according to the change in the image pickup direction as detected by the detection section and define the reading range of the second image to be read out next according to the first quantity of movement, and
determine a center position of the reading range of each second image according to the magnitude relationship between the first quantity of movement and the reading range; and
the image pickup section is adapted to:
obtain information indicative of a completion of an image pickup operation; and
generate an instruction to encode data associated with the synthesized first image, in response to the obtained information.

23. An image pickup apparatus for synthetically generating a first image, or a whole image of an entire object of shooting, the apparatus having at least:
an image pickup section that sequentially changes an image pickup direction and picks up images of parts of the object of shooting to be imaged; and
a reading section that reads second images, each having a predetermined width and constituting a part of at least one of the images picked up on an imaging plane in the image pickup section, the apparatus comprising:
a first cabinet adapted to rotate around a rotary shaft linked thereto so as to sequentially change the image pickup direction of the image pickup section;
an electronic circuit including:
a defining section that defines a reading range of each second image to be read by the reading section;
a synthesizing section that generates the first image by sequentially and synthetically combining the second images read out by the reading section; and
a relative position identifying section that identifies the relative position of each second image relative to the first image;
a display section that displays the generated synthesized image;
a drive section that drives the rotary shaft to revolve;
a specifying section that specifies the timing of the start and that of the end of each image pickup session of the image pickup section;
a battery for driving the components to operate; and
a second cabinet linked to the first cabinet by way of the rotary shaft and adapted to be held by one hand by the user, at least one of the electronic circuit, the display section, the drive section, the specifying section and the battery being arranged in the second cabinet,
wherein:
the defining section is adapted to:
determine a first quantity of movement of each second image by referring to the relative position thereof as identified by the relative position identifying section and define the reading range of the second image to be read out next according to the first quantity of movement, and
determine a center position of the reading range of each second image according to the magnitude relationship between the first quantity of movement and the reading range; and
the image pickup section is adapted to:
obtain, from the specifying section, information indicative of the end of at least one of the image pickup sessions; and
generate an instruction to encode data associated with the synthesized first image, in response to the obtained information.

* * * * *